(12) United States Patent
Tang et al.

(10) Patent No.: US 11,531,867 B2
(45) Date of Patent: Dec. 20, 2022

(54) USER BEHAVIOR PREDICTION METHOD AND APPARATUS, AND BEHAVIOR PREDICTION MODEL TRAINING METHOD AND APPARATUS

(71) Applicant: HUAWEI TECHNOLOGIES CO., LTD., Guangdong (CN)

(72) Inventors: Ruiming Tang, Shenzhen (CN); Minzhe Niu, Shanghai (CN); Yanru Qu, Shenzhen (CN); Weinan Zhang, Shenzhen (CN); Yong Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 455 days.

(21) Appl. No.: 16/850,549

(22) Filed: Apr. 16, 2020

(65) Prior Publication Data

US 2020/0242450 A1     Jul. 30, 2020

Related U.S. Application Data

(63) Continuation of application No. PCT/CN2019/077452, filed on Mar. 8, 2019.

(30) Foreign Application Priority Data

Jun. 20, 2018   (CN) .......................... 201810636443.8

(51) Int. Cl.
   *G06N 3/04*      (2006.01)
   *G06F 17/16*     (2006.01)
   (Continued)

(52) U.S. Cl.
   CPC .......... *G06N 3/0472* (2013.01); *G06F 17/16* (2013.01); *G06K 9/6256* (2013.01); *G06N 3/0445* (2013.01); *G06N 3/063* (2013.01)

(58) Field of Classification Search
   CPC .... G06N 3/0472; G06N 3/0445; G06N 3/063; G06N 3/04; G06F 17/16; G06K 9/6256; G06Q 30/0271; G06Q 10/04
   See application file for complete search history.

(56) References Cited

U.S. PATENT DOCUMENTS

| | | | |
|---|---|---|---|
| 11,068,758 B1 * | 7/2021 | Liachenko | G06K 9/6263 |
| 2012/0022952 A1 | 1/2012 | Cetin et al. | |

(Continued)

FOREIGN PATENT DOCUMENTS

| | | |
|---|---|---|
| CN | 103996088 A | 8/2014 |
| CN | 105160548 A | 12/2015 |

(Continued)

OTHER PUBLICATIONS

Office Action issued in Chinese Application No. 201810636443.8 dated Aug. 28, 2020, 26 pages (with English translation).

(Continued)

*Primary Examiner* — Aaron W Carter
(74) *Attorney, Agent, or Firm* — Fish & Richardson P.C.

(57) ABSTRACT

Example user behavior prediction methods and apparatus are described. One example method includes obtaining a first contribution value of each piece of characteristic data for a specified behavior after obtaining behavior prediction information including a plurality of pieces of characteristic data. Every N pieces of characteristic data in the plurality of pieces of characteristic data may be processed by using one corresponding characteristic interaction model, to obtain a second contribution value of the every N pieces of characteristic data for the specified behavior. Finally, an execution probability of executing the specified behavior by a user may be determined based on the obtained first contribution value and the obtained second contribution value, to predict a user behavior. In the example method, interaction impact (Continued)

of the plurality of pieces of characteristic data on the specified behavior is considered during behavior prediction.

19 Claims, 11 Drawing Sheets

(51) Int. Cl.
*G06K 9/62* (2022.01)
*G06N 3/063* (2006.01)

(56) References Cited

U.S. PATENT DOCUMENTS

| | | | |
|---|---|---|---|
| 2014/0100835 | A1 | 4/2014 | Majumdar et al. |
| 2015/0186800 | A1 | 7/2015 | Kaplow et al. |
| 2015/0262205 | A1* | 9/2015 | Theocharous ..... G06Q 30/0202 705/7.31 |
| 2016/0217383 | A1 | 7/2016 | Zhang et al. |
| 2018/0129929 | A1 | 5/2018 | Shigenaka et al. |
| 2019/0205704 | A1 | 7/2019 | Zhu |
| 2020/0242450 | A1* | 7/2020 | Tang .................. G06N 3/04 |
| 2020/0272913 | A1* | 8/2020 | Yu ..................... G06N 3/08 |
| 2020/0349438 | A1* | 11/2020 | Takamatsu ........... G06N 20/00 |
| 2021/0350211 | A1* | 11/2021 | Dalli .................. G06N 3/0454 |
| 2022/0067520 | A1* | 3/2022 | Dalli .................. G06N 3/006 |
| 2022/0198254 | A1* | 6/2022 | Dalli .................. G06N 3/0445 |
| 2022/0198289 | A1* | 6/2022 | Guo ................... G06N 3/084 |

FOREIGN PATENT DOCUMENTS

| | | |
|---|---|---|
| CN | 105631711 A | 6/2016 |
| CN | 105654200 A | 6/2016 |
| CN | 105868847 A | 8/2016 |
| CN | 106776884 A | 5/2017 |
| CN | 107798332 A | 3/2018 |
| CN | 108038720 A | 5/2018 |
| CN | 108062573 A | 5/2018 |
| CN | 108122122 A | 6/2018 |

OTHER PUBLICATIONS

Shalev-Shwartz et al., "Failures of Gradient-Based Deep Learning," Proceedings of the 34th International Conference on Machine Learning (PMLR 2017), Mar. 2017, 9 pages.

Juan et al., "Field-aware Factorization Machines for CTR Prediction," Proceedings of the 10th ACM Conference on Recommender Systems (ReeSys 2016), Sep. 15-19, 2016, 8 pages.

Zhang et al., "Deep Learning over Multi-field Categorical Data: A Case Study on User Response Prediction," arXiv:1601.02376v1 [cs.LG], Jan. 11, 2016, 12 pages.

Sohu Media Platform [online], "How to use deep learning to realize user behavior prediction and recommendation," Big Data and multi-state calculations of the film: Liu Qiang, etc, Jun. 2018, Retrieved from the Internet <https://rn.sohu.com/n/497495737/?wscrid=95360_6>, 9 pages (English translation).

PCT International Search Report and Written Opinion issued in International Application No. PCT/CN2019/077452 dated Jun. 13, 2019, 12 pages (partial English translation).

Kumar et al., "Predicting Clicks: CTR Estimation of Advertisements using Logistic Regression Classifier," 2015 IEEE International Advance Computing Conference (IACC), Jun. 2015, 5 pages.

Lujia et al., "Research on Click-Through Rate Prediction of Advertisement Based on GMM-FMs," Computer Engineering, vol. 45 No. 5, May 2019, 5 pages (with English abstract).

Office Action issued in Chinese Application No. 201810636443.8 dated Sep. 8, 2021, 8 pages (with English translation).

Ping-wu, "Research and Implementation of Mobile Advertising Click through Rate Prediction," Thesis submitted to Southeast University for the Professional Degree of Master of Engineering, 64 pages (with English Abstract), Jun. 2017.

Siqin, "Research on Click-Through Rate Prediction for Search Advertising Based on Deep Learning," Dissertation for Master Degree in Engineering, School of Computer Science and Technology, Jun. 2015, 65 pages (with English Abstract).

Ta, "Factorization Machines with Follow-the-Regularized-Leader for CTR prediction in Display Advertising," 2015 IEEE International Conference on Big Data (Big Data), Oct. 2015, 3 pages.

Extended European Search Report issued in European Application No. 19822110.3 dated Sep. 16, 2020, 9 pages.

Guo et al., "DeepFM: A Factorization-Machine based Neural Network for CTR Prediction," arXiv:1703.04247v1 [cs.IR] Mar. 13, 2017, 8 pages.

Rendle, "Factorization Machines," 2010 IEEE International Conference on Data Mining, Dec. 13-17, 2010, 6 pages.

Bo et al., "The Application of Integration Model Based on Factorization Machine in Advertising CTR Prediction," Computer Applications and Software, vol. 35, No. 1, Jan. 2018, 6 pages.

Office Action issued in Chinese Application No. 201810636443.8 dated Jan. 12, 2021, 12 pages.

* cited by examiner

USER BEHAVIOR PREDICTION METHOD AND APPARATUS, AND BEHAVIOR PREDICTION MODEL TRAINING METHOD AND APPARATUS

CROSS-REFERENCE TO RELATED APPLICATIONS

This application is a continuation of International Application No. PCT/CN2019/077452, filed on Mar. 8, 2019, which claims priority to Chinese Patent Application No. 201810636443.8, filed on Jun. 20, 2018. The disclosures of the aforementioned applications are hereby incorporated by reference in their entireties.

TECHNICAL FIELD

This application relates to the big data processing field, and in particular, to a user behavior prediction method and apparatus, and a behavior prediction model training method and apparatus.

BACKGROUND TECHNOLOGY

User behavior prediction is a technology of predicting a user behavior based on behavior prediction information (for example, user attribute data, current environment data, and attribute data of a behavior execution object). The user behavior prediction technology is widely applied to fields such as personalized recommendation and precise advertisement push.

In a related technology, a linear regression model (LR model) is usually used to predict a user behavior. For behavior prediction information of a specified behavior, the LR model may be used to calculate a contribution value of each piece of characteristic data in the behavior prediction information for the specified behavior, and then add up the contribution values of all the characteristic data for the specified behavior, to obtain a probability of executing the specified behavior by a user. The contribution value may be used to indicate a degree of impact of the characteristic data on execution of the specified behavior by the user, and the contribution value is positively correlated with the degree of impact.

However, only a degree of impact of each piece of characteristic data on the specified behavior is considered in the LR model in the related technology, and accuracy of the user behavior prediction method is relatively low.

SUMMARY

This application provides a user behavior prediction method and apparatus, and a behavior prediction model training method and apparatus, to resolve a problem of relatively low accuracy of a behavior prediction method in a related technology.

According to one aspect, a user behavior prediction method is provided. The method may include: obtaining behavior prediction information that is used to predict a specified behavior, where the behavior prediction information may include a plurality of pieces of characteristic data, and any two pieces of characteristic data belong to different categories; then obtaining a first contribution value of each of the plurality of pieces of characteristic data for the specified behavior, where the first contribution value is used to indicate a degree of impact on execution of the specified behavior, and the first contribution value is positively correlated with the degree of impact; processing every N pieces of characteristic data in the plurality of pieces of characteristic data by using one corresponding characteristic interaction model, to obtain a second contribution value of the every N pieces of characteristic data for the specified behavior, where N is an integer greater than 1, one characteristic interaction model corresponding to any N pieces of characteristic data is determined based on N categories to which the any N pieces of characteristic data belong, the second contribution value is used to indicate a degree of impact on execution of the specified behavior, and the second contribution value is positively correlated with the degree of impact; and finally, determining an execution probability of the specified behavior based on the obtained first contribution value of each piece of characteristic data and the obtained second contribution value of the every N pieces of characteristic data.

According to the user behavior prediction method provided in this application, when the specified behavior is predicted, interaction impact of the plurality of pieces of characteristic data on the specified behavior is considered, and therefore, behavior prediction accuracy can be effectively improved. In addition, the characteristic interaction model corresponding to the every N pieces of characteristic data is determined based on a category to which the N pieces of characteristic data belong. That is, every N categories correspond to one characteristic interaction model. Therefore, not only a problem that a prediction result is poor because all characteristic data is processed by using a same characteristic interaction model can be avoided, but also a problem that calculation complexity is excessively high because the every N pieces of characteristic data each are processed by using an independent characteristic interaction model can be avoided. That is, according to the behavior prediction method provided in this application, a relatively good prediction effect can be achieved with relatively low calculation complexity.

Optionally, a process of determining an execution probability of the specified behavior based on the obtained first contribution value of each piece of characteristic data and the obtained second contribution value of the every N pieces of characteristic data may include:

determining a first comprehensive contribution value based on the obtained first contribution value of each piece of characteristic data; determining a second comprehensive contribution value based on the obtained second contribution value of the every N pieces of characteristic data and finally, performing weighted summation on the first comprehensive contribution value and the second comprehensive contribution value by using a preset weight value, to obtain the execution probability.

The preset weight value may be obtained by pre-training training sample data, and weighted summation is performed on the two comprehensive contribution values by using the preset weight value, to better balance impact of independent characteristic data on the specified behavior and interaction impact of the plurality of characteristic data on the specified behavior, and ensure a prediction effect of behavior prediction.

Optionally, a process of determining a second comprehensive contribution value based on the obtained second contribution value of the every N pieces of characteristic data may include:

directly performing summation on the obtained second contribution value of the every N pieces of characteristic data, to obtain the second comprehensive contribution value, where the method for obtaining the second comprehensive contribution value is relatively simple, and calculation complexity is relatively low; or inputting the obtained second contribution value of the every N pieces of characteristic data into a neural network, and using an output of the neural network as the second comprehensive contribution value, where the neural network may be a multilayer neural network, and a weight and an offset that are between neurons may be obtained by pre-training the training sample data; and the second comprehensive contribution value is obtained by using a neural network obtained through pre-training, to ensure accuracy of the obtained second comprehensive contribution value, and further ensure a prediction effect of behavior prediction.

Optionally, a process of determining a first comprehensive contribution value based on the obtained first contribution value of each piece of characteristic data may include:

directly performing summation on the obtained first contribution value of each piece of characteristic data and a reference contribution value, to obtain the first comprehensive contribution value.

The reference contribution value may be obtained by pre-training the training sample data.

Optionally, before the obtaining a first contribution value of each of the plurality of pieces of characteristic data for the specified behavior, the method may further include:

determining a characteristic identifier of each of the plurality of pieces of characteristic data based on a correspondence between characteristic data and a characteristic identifier, where the characteristic identifier may be a code word or a vector that meets a preset format requirement. Because characteristic data in the behavior prediction information may have different data formats, a characteristic identifier of each piece of characteristic data is first obtained, and all the characteristic data may be converted into characteristic identifiers in a unified format, to facilitate subsequent data processing and improve behavior prediction efficiency.

Optionally, a process of obtaining a first contribution value of each of the plurality of pieces of characteristic data for the specified behavior may include:

separately determining, based on a correspondence between a characteristic identifier and a contribution value, a first contribution value corresponding to the characteristic identifier of each of the plurality of pieces of characteristic data.

The correspondence between characteristic identifier and a contribution value may be obtained by training the training sample data, and the first contribution value of each piece of characteristic data is directly obtained based on the correspondence, so that efficiency is relatively high.

Optionally, a process of processing every N pieces of characteristic data in the plurality of pieces of characteristic data by using one corresponding characteristic interaction model, to obtain a second contribution value of the every N pieces of characteristic data for the specified behavior may include:

obtaining a characteristic vector corresponding to a characteristic identifier of each of the every N pieces of characteristic data, where the characteristic vectors corresponding to the characteristic identifiers have an equal length; and then processing the obtained N characteristic vectors by using one characteristic interaction model corresponding to N categories to which the every N pieces of characteristic data belong, to obtain the second contribution value of the every N pieces of characteristic data for the specified behavior.

Characteristic identifiers corresponding to different characteristic data may have different lengths, and characteristic identifiers of some categories of characteristic data (for example, a city, a time, and a temperature) may have excessively long lengths, but there is a relatively small amount of valid information. Therefore, characteristic identifiers of all characteristic data are converted into characteristic vectors with a uniform length, and then the characteristic vectors are processed, to improve data processing efficiency.

Optionally, before the processing every N pieces of characteristic data in the plurality of pieces of characteristic data by using one corresponding characteristic interaction model, the method may further include:

determining one corresponding characteristic interaction model for the every N pieces of characteristic data in the plurality of pieces of characteristic data based on a correspondence between a characteristic interaction model and a category, where the correspondence includes a plurality of characteristic interaction models, each characteristic interaction model corresponds to N categories, and any two characteristic interaction models correspond to different categories.

Optionally, the first contribution value, the second contribution value, and the execution probability may be all obtained by a behavior prediction model. The method may further include the following training process:

obtaining training sample data, where the training sample data may include a plurality of pieces of sample characteristic data and a behavior label of a sample behavior, any two pieces of sample characteristic data belong to different categories, and the behavior label is used to indicate whether a user executes the sample behavior; then obtaining a first reference contribution value of each of the plurality of pieces of sample characteristic data for the sample behavior, and processing the every N pieces of sample characteristic data in the plurality of pieces of sample characteristic data by using one corresponding characteristic interaction model, to obtain a second reference contribution value of the every N pieces of sample characteristic data for the sample behavior; further determining an execution probability of the sample behavior based on the obtained first reference contribution value of each piece of sample characteristic data and the obtained second reference contribution value of the every N pieces of sample characteristic data; and finally, adjusting a model parameter of the behavior prediction model based on a difference between the execution probability of the sample behavior and the behavior label, and continuing training until a training stop condition is met, to obtain the behavior prediction model whose model parameter is adjusted.

The adjusted model parameter of the behavior prediction model may include a model parameter of each characteristic interaction model, and may further include a first reference contribution value corresponding to each piece of sample characteristic data.

In this application, the behavior prediction model obtained through training in the foregoing training process may include a plurality characteristic interaction models, and each characteristic interaction model may correspond to N categories. When the behavior prediction model is used to perform behavior prediction, interaction impact of the N pieces of characteristic data on the specified behavior may be considered, and therefore, prediction accuracy can be effectively improved.

Optionally, a process of determining an execution probability of the sample behavior based on the obtained first reference contribution value of each piece of sample characteristic data and the obtained second reference contribution value of the every N pieces of sample characteristic data may include:

performing summation on the obtained first reference contribution value of each piece of sample characteristic data and the reference contribution value, to obtain a first reference comprehensive contribution value, inputting the obtained second reference contribution value of each piece of sample characteristic data into a neural network, and using an output of the neural network as a second reference comprehensive contribution value; and finally, performing weighted summation on the first reference comprehensive contribution value and the second reference comprehensive contribution value based on the preset weight value, to obtain the execution probability of the sample behavior.

Correspondingly, the adjusted model parameter of the behavior prediction model may further include at least the reference contribution value, the weight and the offset that are between neurons in the neural network, and the preset weight value.

Optionally, the characteristic interaction model may include a kernel function, and a form of the kernel function may be a vector, a matrix, or a functional kernel. The kernel function has various forms, and there is relatively high flexibility in modeling the behavior prediction model.

Optionally, N may be 2. That is, every two pieces of characteristic data may be processed by using characteristic interaction models corresponding to two categories to which the two pieces of characteristic data belong, so that a prediction effect of behavior prediction can be improved.

Optionally, the behavior prediction information may include user attribute data, current environment data, and attribute data of an execution object of the specified behavior.

The user attribute data is characteristic data used to describe a user attribute, and may include a plurality of categories of characteristic data such as a gender, an age, and an occupation. The current environment data is characteristic data used to describe an environment status at a behavior prediction moment, and may include a plurality of categories of characteristic data such as a time, a location, and weather. The attribute data of the execution object of the specified behavior is characteristic data used to describe an attribute of the execution object, and may include a plurality of categories of characteristic data such as a brand and a category of the execution object.

According to another aspect, a behavior prediction model training method is provided. The behavior prediction model includes a plurality of characteristic interaction models, each characteristic interaction model corresponds to N categories, any two characteristic interaction models correspond to different categories, and the category is a category of sample characteristic data in training sample data. The training method may include:

obtaining training sample data, where the training sample data may include a plurality of pieces of sample characteristic data and a behavior label of a sample behavior, any two pieces of sample characteristic data belong to different categories, and the behavior label is used to indicate whether a user executes the sample behavior; then obtaining a first reference contribution value of each of the plurality of pieces of sample characteristic data for the sample behavior, where the first reference contribution value is used to indicate a degree of impact on execution of the sample behavior, and the first reference contribution value is positively correlated with the degree of impact; processing every N pieces of sample characteristic data in the plurality of pieces of sample characteristic data by using one corresponding characteristic interaction model, to obtain a second reference contribution value of the every N pieces of sample characteristic data for the sample behavior, where the second reference contribution value is used to indicate a degree of impact on execution of the sample behavior, and the second reference contribution value is positively correlated with the degree of impact; further determining an execution probability of the sample behavior based on the obtained first reference contribution value of each piece of sample characteristic data and the obtained second reference contribution value of the every N pieces of sample characteristic data; and finally, adjusting a model parameter of the behavior prediction model based on a difference between the execution probability of the sample behavior and the behavior label, and continuing training until a training stop condition is met, to obtain the behavior prediction model whose model parameter is adjusted.

The behavior prediction model obtained through training in the model training method provided in this application may include a plurality characteristic interaction models, and each characteristic interaction model may correspond to N categories. When the behavior prediction model is used to perform behavior prediction, interaction impact of the N pieces of characteristic data on the specified behavior may be considered, and therefore, prediction accuracy can be effectively improved.

In addition, every N categories correspond to one characteristic interaction model during model training. Therefore, not only a problem that a prediction result is poor because all characteristic data is processed by using a same characteristic interaction model can be avoided, but also a problem that calculation complexity is excessively high because the every N pieces of sample characteristic data each are processed by using an independent characteristic interaction model can be avoided. That is, according to the training method provided in this embodiment of the present application, a relatively good prediction effect can be achieved with relatively low calculation complexity.

Optionally, a process of determining an execution probability of the sample behavior based on the obtained first reference contribution value of each piece of sample characteristic data and the obtained second reference contribution value of the every N pieces of sample characteristic data may include:

performing summation on the obtained first reference contribution value of each piece of sample characteristic data and a reference contribution value, to obtain the first reference comprehensive contribution value; then inputting the obtained second reference contribution value of each piece of sample characteristic data into a neural network, and using an output of the neural network as the second reference comprehensive contribution value; and then performing weighted summation on the first reference comprehensive contribution value and the second reference comprehensive contribution value by using the preset weight value, to obtain the execution probability of the sample behavior.

Correspondingly, the model parameter adjusted based on the difference may further include at least the reference contribution value, a weight and an offset that are between neurons in the neural network, and the preset weight value.

According to still another aspect, a user behavior prediction apparatus is provided. The apparatus may include at least one module, and the at least one module may be configured to implement the user behavior prediction method according to the foregoing aspects.

According to yet another aspect, a behavior prediction model training apparatus is provided. The apparatus may include at least one module, and the at least one module may be configured to implement the behavior prediction model training method according to the foregoing aspects.

According to yet another aspect, a server is provided. The server may include a storage, a processor, and a computer program that is stored in the storage and can run on the processor. When executing the computer program, the processor implements the user behavior prediction method according to the foregoing aspects or the behavior prediction model training method according to the foregoing aspects.

According to yet another aspect, a computer readable storage medium is provided. The computer readable storage medium stores an instruction. When the computer readable storage medium runs on a computer, the computer is enabled to perform the user behavior prediction method according to the foregoing aspects or the behavior prediction model training method according to the foregoing aspects.

According to yet another aspect, a computer program product including an instruction is provided. When the computer program product runs on a computer, the computer is enabled to perform the user behavior prediction method according to the foregoing aspects or the behavior prediction model training method according to the foregoing aspects.

Beneficial effects brought by the technical solutions provided in this application may include at least the following operations:

when the execution probability of the specified behavior is predicted based on the obtained behavior prediction information, the first contribution value of each piece of characteristic data for the specified behavior may be separately calculated, and the second contribution value of N pieces of characteristic data for the specified behavior may be calculated based on the characteristic interaction model. The interaction impact of the plurality of pieces of characteristic data on the specified behavior is considered, and therefore, behavior prediction accuracy is effectively improved. In addition, the characteristic interaction model corresponding to the every N pieces of characteristic data is determined based on a category to which the N pieces of characteristic data belong. That is, every N categories correspond to one characteristic interaction model. Therefore, not only a problem that a prediction result is poor because all characteristic data is processed by using a same characteristic interaction model can be avoided, but also a problem that calculation complexity is excessively high because the every N pieces of characteristic data each are processed by using an independent characteristic interaction model can be avoided. That is, according to the technical solutions provided in this application, a relatively good prediction effect can be achieved with relatively low calculation complexity.

DESCRIPTION OF EMBODIMENTS

A user behavior prediction method provided in embodiments of the present invention may be applied to an object push system, and the object push system may be deployed on a server. The server establishes communication connections to a plurality of terminals through a wired network or a wireless network, and can push an object such as an application program, news, or an advertisement to a user of each terminal. The server may be one server, a server cluster including several servers, or a cloud computing service center. The terminal may be a smartphone, a desktop computer, a notebook computer, a tablet computer, a wearable device, or the like.

Optionally, the object push system may include a personalized recommendation system, a precise advertisement push system, and the like. The personalized recommendation system may recommend an object such as an application program and media content (for example, a video, news, or music) to a user of the terminal. The precise advertisement push system may push an advertisement to the user of the terminal. A good object push system not only affects user experience, but also directly affects a profit of an object provider (for example, an application developer and a content provider).

Figure 1:
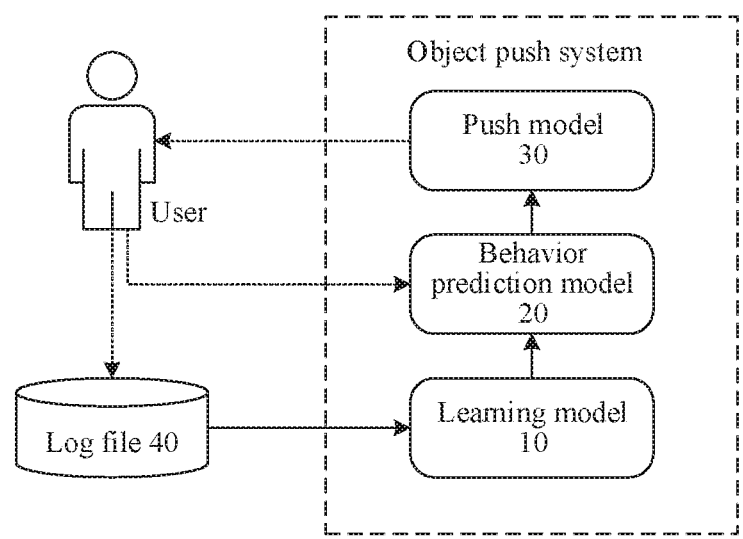
FIG. 1 is a schematic structural diagram of an object push system according to an embodiment of the present invention.

As shown in FIG. 1, an object push system provided in an embodiment of the present invention may include a learning module 10, a behavior prediction model 20, and a push model 30. The learning module 10, the behavior prediction model 20, and the push model 30 may be deployed on a same server, or may be deployed on different servers. For example, the learning module 10 and the behavior prediction model 20 may be deployed on a training server, and the push model 30 may be deployed on a backend server of an object provider. The learning module 10 is configured to: obtain historical behavior information that is of a user and that is recorded in a log file 40, use the historical behavior information as training sample data, and train the training sample data by using a machine learning algorithm. After the training ends, the learning module 10 may update a model parameter of the behavior prediction model 20 based on a training result. The behavior prediction model 20 may determine, based on obtained behavior prediction information that is used to predict a specified behavior, a probability of executing the specified behavior by the user, and send the determined probability to the push model 30. The push model 30 may rank probabilities that are of executing all specified behaviors by the user and that are determined by the behavior prediction model 20, and push an execution object of a specified behavior with a relatively high probability to the user.

The log file 40 may be a network (Web) log, a log obtained by using a packet sniffer, a log obtained by using a tracing point technology, or a log obtained in another manner. This is not limited in this embodiment of the present invention. The behavior prediction information that is used to predict the specified behavior may include data such as user attribute data (for example, a gender, an age, an occupation, and an education of the user), attribute data (for example, a type, a release time, and a brand of an application program) of an execution object of the specified behavior, and current environment data (for example, a time, weather, a temperature, and a location).

For example, it is assumed that the object push system is a personalized recommendation system used to push an application program, and the personalized recommendation system is deployed on a backend server of an application market. When the user starts an application program, namely, the application market, installed on a mobile phone, the application market may send a recommendation request to the backend server. After the backend server receives the recommendation request, the backend server may separately obtain behavior prediction information that is used to predict a behavior of downloading each of a plurality of candidate application programs by the user, and may predict, based on the obtained behavior prediction information, a probability of downloading each candidate application program. Then, the backend server may recommend several applications with relatively high probabilities to the application market for display, to improve a download rate of the application program. In addition, actual download behavior data of the user is stored in the log file 40 and is used as new training sample data, so that the learning module 10 continuously updates the model parameter of the behavior prediction model 20 by training the new training sample data, to improve a prediction effect of the behavior prediction model 20.

In a precise advertisement push system, the behavior prediction model 20 is mainly used to predict an advertisement click behavior of the user. Correspondingly, the historical behavior information obtained by the learning module 10 may be historical advertisement click data of the user. The behavior prediction model 20 may predict, based on the obtained user attribute data, the current environment data, and attribute data of each candidate advertisement provided by an advertiser, a probability of clicking each advertisement by the user, and display an advertisement with a highest probability to the user. In addition, actual click behavior data of the user is stored in the log file 40 and is used as new training sample data, so that the learning module 10 continues to train the new training sample data.

The historical advertisement click data obtained by the learning module 10 usually includes a plurality of pieces of characteristic data belonging to different categories. For example, each piece of historical advertisement click data may include a plurality of categories of characteristic data such as an age of the user, a gender of the user, a city in which a user is located, an advertisement click time, an advertisement brand, and an internet protocol (IP) address. Two pieces of historical advertisement click data are used as examples below:

Beijing, Tuesday, 17:00, fast food A, and 0; and
Shanghai, Sunday, 11:20, fast food B, and 1.

In the two pieces of historical advertisement click data, the first four items are all characteristic data, and the last item is a behavior label. The behavior label may be used to indicate whether the user clicks an advertisement. For example, 1 indicates that the user clicks the advertisement, and 0 indicates that the user does not click the advertisement. In the two pieces of historical advertisement click data, categories to which characteristic data included in each piece of historical advertisement click data belongs are sequentially a city in which the user is located, a week, a time, and an advertisement brand. Therefore, the second historical advertisement click data may indicate one behavior of clicking, by a user in Shanghai, an advertisement of the fast food A at 11:20 am, on Sunday.

It can be learned from the foregoing example that a plurality of pieces of characteristic data included in the historical advertisement click data belong to different categories, the plurality of pieces of characteristic data have a relatively strong discrete characteristic (that is, each piece of characteristic data may be represented by using a discrete value), and different categories of characteristic data have a complex interaction relationship: Interaction between different categories of characteristic data and a probability of clicking an advertisement by the user are sometimes positively correlated and sometimes negatively correlated. For example, a food-related advertisement is more likely to be clicked during a meal time, but there is a relatively low probability of clicking a cold drink-related advertisement in winter. Therefore, exploiting a relationship between characteristic data has important impact on improving push accuracy of the object push system.

Figure 2:
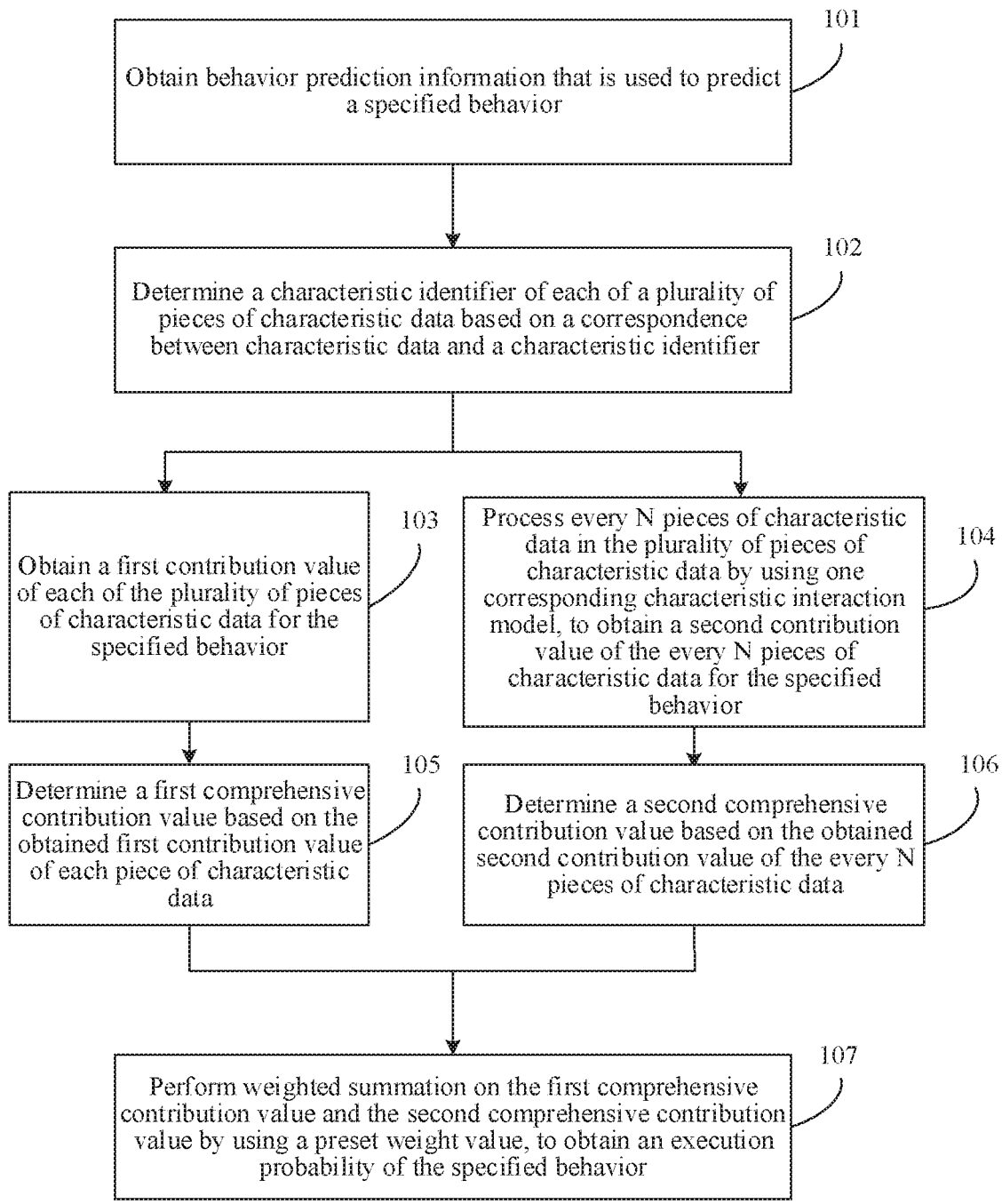
FIG. 2 is a flowchart of a user behavior prediction method according to an embodiment of the present invention.

An embodiment of the present invention provides a user behavior prediction method, to improve behavior prediction accuracy by analyzing interaction impact of different categories of characteristic data on a specified behavior. The method may be applied to the behavior prediction model 20 in the object push system shown in FIG. 1, and the object push system may be deployed on a server. Referring to FIG. 2, the method may include the following steps.

Step 101: Obtain behavior prediction information that is used to predict a specified behavior.

In this embodiment of the present invention, after receiving a prediction request sent by a terminal, the behavior prediction model may obtain the behavior prediction information that is used to predict the specified behavior. The specified behavior may be one of a plurality of candidate behaviors preconfigured in the object push system. The behavior prediction information that is used to predict the specified behavior may include a plurality of pieces of characteristic data, and any two pieces of characteristic data belong to different categories.

The prediction request may be a request for obtaining a candidate object by the terminal. For example, the prediction request may be an object obtaining request sent by the terminal to a backend server after a user instructs the terminal to start an application program (for example, an application market, news, or a video). The object obtaining request is used to request to obtain a candidate object such as an application program, news, or a video. Alternatively, the prediction request may be a request for obtaining a specified object by the terminal. For example, the prediction request may be a video object obtaining request sent by the terminal to a backend server after a user instructs the terminal to play a video online. After receiving the video object obtaining request, before sending a video object to the terminal, the backend server may predict, based on the obtained behavior prediction information, a probability of clicking each candidate advertisement by the user of the terminal, and push an advertisement with a highest probability to the terminal.

Optionally, the behavior prediction information that is used to predict the specified behavior may include user attribute data, current environment data, and attribute data of an execution object of the specified behavior. The user attribute data may be characteristic data that is used to describe a user attribute, for example, may include a plurality of categories of characteristic data such as a gender, an age, an occupation, an education, and a birthplace. The current environment data is characteristic data that is used to describe an environment status at a behavior prediction moment, for example, may include a plurality of categories of characteristic data such as a time, a location, a temperature, and weather. The attribute data of the execution object of the specified behavior may be characteristic data that is used to describe an attribute of the execution object, for example, may include a plurality of categories of characteristic data such as a brand, a type, and a release time of the execution object. The user attribute data in the behavior prediction information may be obtained from a log file, or may be obtained from a backend server (for example, a user database of a video server) of an object provider. The attribute data of the execution object may be obtained from the log file, or may be obtained from the backend server (for example, the user database of the video server) of the object provider.

For example, assuming that the object push system is a precise advertisement push system that is used to push an advertisement before video play, the user behavior is a behavior of clicking an advertisement by the user, and the prediction request may be a request sent by the terminal for obtaining the video object. If the push model 30 in the precise advertisement push system prestores five candidate advertisements in total from an advertisement A to an advertisement E, after the behavior prediction model 20 in the precise advertisement push system detects the prediction request, the behavior prediction model 20 in the precise advertisement push system may separately obtains behavior prediction information that is used to predict a behavior of clicking each candidate advertisement by the user. For example, the behavior prediction information that is obtained by the behavior prediction model 20 and that is used to predict a behavior of clicking the advertisement A by the user may include a female, 30 years old, 12:00, the advertisement A. and food. Categories to which the plurality of pieces of characteristic data included in the behavior prediction information belong are sequentially a gender, an age, a time, an advertisement brand, and an advertisement type. The gender and the age are user attribute data, the time is current environment data, and the advertisement brand and the advertisement type are attribute data of the execution object.

Step 102: Determine a characteristic identifier of each of a plurality of pieces of characteristic data based on a correspondence between characteristic data and a characteristic identifier. Then step 103 or step 104 is performed.

Each piece of characteristic data in the behavior prediction information may have a different data format. Therefore, to improve data processing efficiency, the behavior prediction model may first determine the characteristic identifier of each piece of characteristic data. The characteristic identifier may be a code word or a vector that meets a preset format requirement. In this way, all the characteristic data may be converted into characteristic identifiers in a unified format, to facilitate subsequent data processing and improve behavior prediction efficiency. Each piece of characteristic data corresponds to a unique characteristic identifier in a category to which the characteristic data belongs, and different categories of characteristic data may correspond to a same characteristic identifier.

Optionally, the characteristic identifier of each piece of characteristic data may be a vector obtained through encoding by using a one-hot code. In the characteristic identifier obtained by using the one-hot code, only one bit is 1, and the other bits are 0. In addition, a length of the characteristic identifier is equal to a total amount of characteristic data included in a category to which the characteristic data belongs. For example, a gender category includes only two types of characteristic data; a male and a female, and therefore, the characteristic identifier obtained by using the one-hot code may be a code word including a 2-bit binary number. For example, a code word corresponding to the female gender may be 01, and a code word corresponding to the male gender may be 10. A week category includes seven types of characteristic data from Monday to Sunday, and therefore, the characteristic identifier obtained by using the one-hot code may be a vector whose length is 7. For example, a characteristic identifier corresponding to Monday may be a vector [1, 0, 0, 0, 0, 0, 0], and a characteristic identifier corresponding to Wednesday may be a vector [0, 0, 1, 0, 0, 0, 0].

In this embodiment of the present invention, the characteristic identifier of each piece of characteristic data may be alternatively a code word or a vector obtained through encoding in another encoding manner, provided that it is ensured that each piece of characteristic data corresponds to a unique characteristic identifier in a category to which the characteristic data belongs. For example, for behavior prediction information: a female, 30 years old, 12:00, an advertisement A. and food, characteristic identifiers that are obtained by a data processing module 201 of the behavior prediction model and that correspond to the five pieces of characteristic data may be sequentially 1, 30, 12, 1, and 4.

Figure 3:
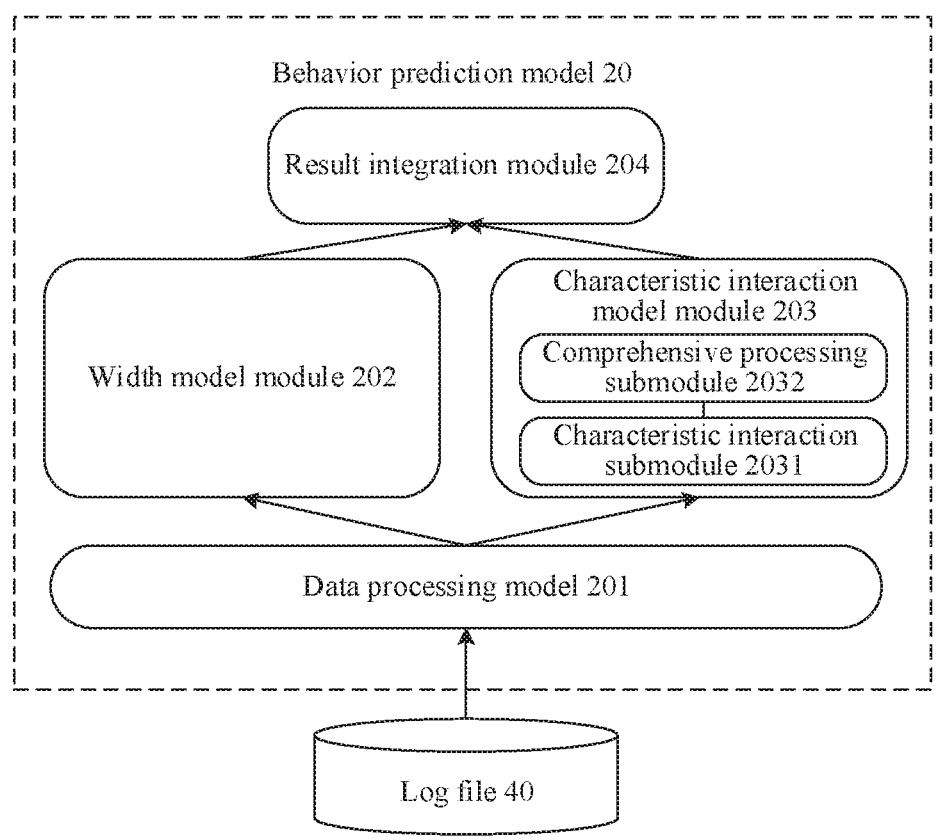
FIG. 3 is a schematic structural diagram of a behavior prediction model according to an embodiment of the present invention.

FIG. 3 is a schematic structural diagram of a behavior prediction model according to an embodiment of the present invention. Referring to FIG. 3, the behavior prediction model may include a data processing module 201, a width model module 202, a characteristic interaction model module 203, and a result integration module 204. Both the step of obtaining the behavior prediction information shown in step 101 and the step of determining the characteristic identifier in step 102 may be implemented by the data processing module 201.

Step 103: Obtain a first contribution value of each of the plurality of pieces of characteristic data for the specified behavior. Then step 105 is performed.

In this embodiment of the present invention, the behavior prediction module may prestore a correspondence between a characteristic identifier and a contribution value. The correspondence is obtained by pre-training training sample data, and the characteristic identifier recorded in the correspondence may include a characteristic identifier of each piece of characteristic data in all characteristic data trained by the behavior prediction model. During user behavior prediction, after obtaining the characteristic identifier of each piece of characteristic data in the behavior prediction information, the behavior prediction model may directly obtain, based on the correspondence, the first contribution value of each piece of characteristic data for the specified behavior.

The first contribution value may be used to indicate a degree of impact of the characteristic data on execution of the specified behavior, and the first contribution value is positively correlated with the degree of impact. That is, a larger first contribution value of a piece of characteristic data indicates a higher degree of impact of the characteristic data on execution of the specified behavior, and therefore, the user is more likely to execute the specified behavior. Optionally, the first contribution value may be a positive number not greater than 1.

Optionally, the step of determining the first contribution value in step 103 may be implemented by the width model module 202. As described above, different categories of characteristic data may have a same characteristic identifier. Therefore, the width model module 202 may store a plurality of correspondences between a characteristic identifier and a contribution value, each correspondence corresponds to one category, and each correspondence is used to record a first contribution value corresponding to each piece of characteristic data in a corresponding category.

To ensure that the width model module 202 can accurately identify each piece of characteristic data, the data processing module 201 may rank characteristic identifiers of all characteristic data in a pre-agreed category sequence (for example, a category of the first piece of characteristic data is a gender, and a category of the second piece of characteristic data is an age) to obtain an identifier sequence, and then input the identifier sequence into the width model module 202. After obtaining the identifier sequence, the width model module 202 may determine, based on the pre-agreed characteristic sequence and a location of each characteristic identifier in the identifier sequence, a category to which characteristic data indicated by the characteristic identifier belongs, further obtain a correspondence corresponding to the category, and obtain a first contribution value of the characteristic data based on the correspondence.

For example, it is assumed that the pre-agreed category sequence is the gender, the age, the time, the advertisement brand, and the advertisement type. If the identifier sequence obtained by the width model module 202 is 1, 30, 12, 1, and 4, the width model module 202 may determine that a category to which characteristic data indicated by the first characteristic identifier 1 in the identification sequence belongs is the gender. Therefore, the width model module 202 may obtain, based on a correspondence between a first contribution value and a characteristic identifier corresponding to a gender, a first contribution value $c_{0,1}$ corresponding to the characteristic identifier 1. Similarly, the width model module 202 may sequentially obtain, in a same method, first contribution values corresponding to the other four characteristic identifiers: $c_{1,30}$, $c_{2,12}$, $c_{3,1}$, and $c_{4,4}$. The first subscript in each first contribution value may indicate a category of characteristic data, namely, a location of a characteristic identifier in the identifier sequence, and the second subscript is a characteristic identifier of characteristic data in a category to which the characteristic data belongs.

Step 104: Process every N pieces of characteristic data in the plurality of pieces of characteristic data by using one corresponding characteristic interaction model, to obtain a second contribution value of the every N pieces of characteristic data for the specified behavior. Then step 106 is performed.

Herein, N is an integer greater than 1, one characteristic interaction model corresponding to any N pieces of characteristic data is determined based on N categories to which the any N pieces of characteristic data belong, the second contribution value is used to indicate a degree of impact on execution of the specified behavior, and the second contribution value is positively correlated with the degree of impact.

In this embodiment of the present invention, the behavior prediction model may include a plurality of characteristic interaction models obtained through pre-training. Each characteristic interaction model corresponds to N categories, and any two characteristic interaction models correspond to different categories. After obtaining the behavior prediction information, the behavior prediction model may determine, based on a correspondence between a characteristic interaction model and a category, one characteristic interaction model corresponding to N categories to which the every N pieces of characteristic data belong. Then, the corresponding N pieces of characteristic data may be processed by using the determined characteristic interaction model, to obtain the second contribution value of the N pieces of characteristic data for the specified behavior.

If the behavior prediction information includes M pieces of characteristic data (namely, M categories), because one corresponding characteristic interaction model needs to be determined for every N pieces of characteristic data in the M pieces of characteristic data, the behavior prediction model needs to process corresponding characteristic interaction data in the behavior prediction information by using a total of $C_M^N$ characteristic interaction models. Correspondingly, the behavior prediction model may finally obtain $C_M^N$ second contribution values. Optionally, in this embodiment of the present invention, N may be 2. That is, every two pieces of characteristic data may be processed by using characteristic interaction models corresponding to two categories to which the two pieces of characteristic data belong, so that a prediction effect of the behavior prediction model can be effectively ensured.

For example, assuming that during model training, a quantity M of categories to which sample characteristic data belongs is 5, and a quantity N of categories corresponding to each characteristic interaction model is 2, the behavior prediction model may include 10 characteristic interaction models. A correspondence between the 10 characteristic interaction models and categories may be shown in Table 1. A characteristic interaction model corresponding to the gender and the age is $\sigma_{0,1}$, and a characteristic interaction model corresponding to the age and the time is $\sigma_{1,2}$. It can be learned from Table 1 that in the behavior prediction model, a characteristic interaction model corresponding to the $i^{th}$ category and the $j^{th}$ category in the plurality of categories may be represented as $\sigma_{i,j}$.

TABLE 1

| Category Characteristic interaction model Category | Gender | Age | Time | Advertisement brand | Advertisement type |
|---|---|---|---|---|---|
| Gender | | $\sigma_{0,1}$ | $\sigma_{0,2}$ | $\sigma_{0,3}$ | $\sigma_{0,4}$ |
| Age | | | $\sigma_{1,2}$ | $\sigma_{1,3}$ | $\sigma_{1,4}$ |
| Time | | | | $\sigma_{2,3}$ | $\sigma_{2,4}$ |
| Advertisement brand | | | | | $\sigma_{3,4}$ |

Further, if categories to which characteristic data included in the behavior prediction information that is obtained by the behavior prediction model belongs are sequentially the gender, the age, the time, the advertisement brand, and the advertisement type (that is, M=5), and N=2, the five categories of characteristic data are combined in pairs, and $C_5^2=10$ category combination manners may be obtained in total. For every two categories, the behavior prediction model may determine, based on correspondences shown in Table 1, a characteristic interaction model corresponding to the two categories. For example, for the gender and the age, the behavior prediction model may determine that a characteristic interaction model corresponding to the two categories is $\sigma_{0,1}$, and the characteristic interaction model $\sigma_{0,1}$ may be used to process characteristic data whose category is the gender and characteristic data whose category is the age, to obtain a second contribution value of the two pieces of characteristic data for the specified behavior.

In an optional implementation of this embodiment of the present invention, because the behavior prediction model obtains the characteristic identifier of each piece of characteristic data in step 102, when obtaining the second contribution value of the every N pieces of characteristic data, the behavior prediction model may first separately obtain a characteristic vector corresponding to a characteristic identifier of each of the N pieces of characteristic data, and then process the obtained N characteristic vectors by using one characteristic interaction model corresponding to N categories to which the N pieces of characteristic data belong, to obtain the second contribution value of the N pieces of characteristic data for the specified behavior.

The behavior prediction model may pre-store a correspondence between a characteristic identifier and a characteristic vector, and characteristic vectors corresponding to the characteristic identifiers have an equal length. A length of the characteristic vector may be determined based on an empirical value, for example, may be 16 or 32. Characteristic identifiers corresponding to different characteristic data may have different lengths, and characteristic identifiers of some categories of characteristic data (for example, a city, a time, and a temperature) may have excessively long lengths, but there is a relatively small amount of valid information. Therefore, to improve data processing efficiency, before the second contribution value of the every N pieces of characteristic data is calculated, characteristic identifiers of all the characteristic data may be converted into characteristic vectors with a uniform length, and then the every N characteristic vectors are processed to obtain the corresponding second contribution value.

Figure 4:
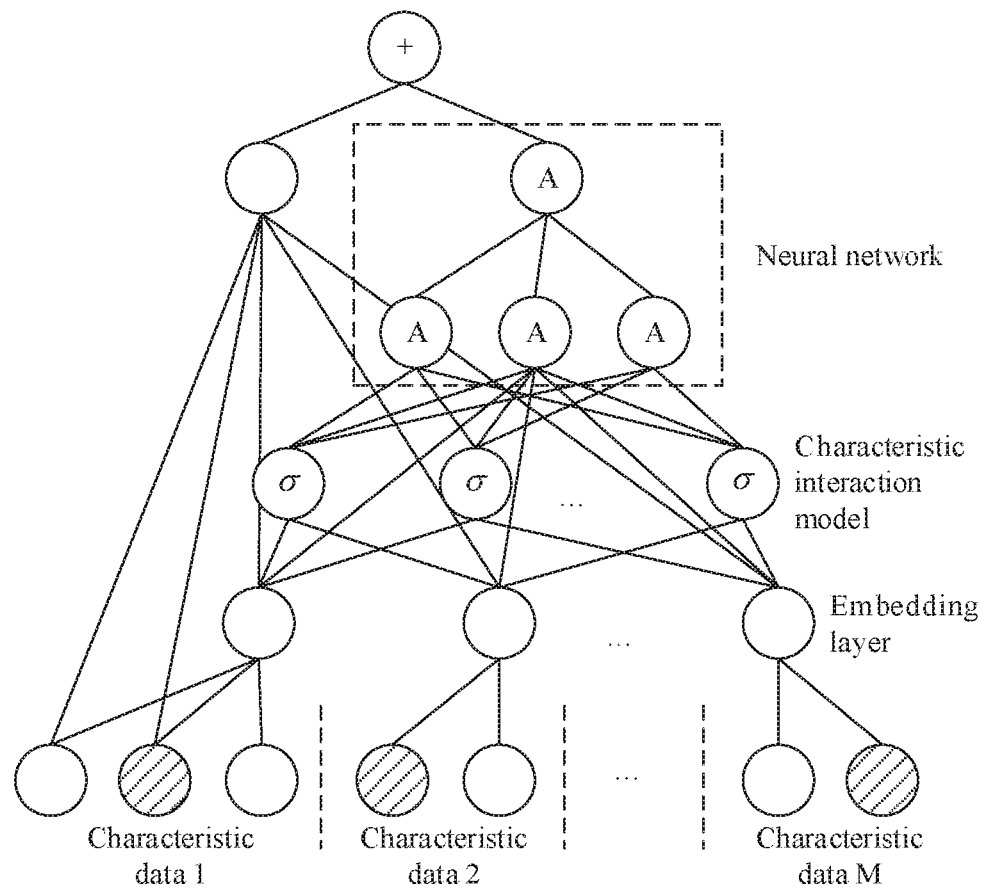
FIG. 4 is a schematic architectural diagram of a behavior prediction model according to an embodiment of the present invention.

Optionally, as shown in FIG. 3, the data processing module 201 may send the generated identifier sequence to a characteristic interaction submodule 2031 of the characteristic interaction model module 203, and then the characteristic interaction submodule 2031 may obtain the second contribution value of the every N pieces of characteristic data. FIG. 4 is an architectural diagram of a behavior prediction model according to an embodiment of the present invention. Referring to FIG. 4, it can be learned that the behavior prediction model may include an embedding layer, and the embedding layer may be a processing layer that is of the data processing module 201 and that is used to convert a characteristic identifier into a characteristic vector. As shown in FIG. 4, the embedding layer may convert each of M pieces of characteristic data into a corresponding characteristic vector, and then input the characteristic vector into the characteristic interaction model.

As described above, different categories of characteristic data may have a same characteristic identifier. Therefore, the width model module 202 may store a plurality of correspondences between a characteristic identifier and a characteristic vector, each correspondence corresponds to one category, and each correspondence is used to record a characteristic vector corresponding to each piece of characteristic data in a corresponding category.

For example, as shown in FIG. 3, it is assumed that an identifier sequence sent by the data processing module 201 to the characteristic interaction submodule 2031 is 1, 30, 12, 1, and 4. The characteristic interaction submodule 2031 may determine, in a pre-agreed category sequence: the gender, the age, the time, the advertisement brand, and the advertisement type, a category to which characteristic data indicated by each characteristic identifier in the identifier sequence belongs. The characteristic interface submodule 2031 may determine that a category to which characteristic data indicated by the first characteristic identifier 1 in the identifier sequence belongs is the gender. Therefore, it may be determined, based on a correspondence between a characteristic vector and a characteristic identifier corresponding to a gender, that the characteristic identifier 1 corresponds to a characteristic vector $v_{0,1}$. Similarly, the characteristic interaction submodule 2031 may sequentially obtain, in a same method, characteristic vectors corresponding to the other four characteristic identifiers: $v_{1,30}$, $v_{2,12}$, $v_{3,1}$, and $v_{4,4}$. The first subscript in each characteristic vector may indicate a category of characteristic data, namely, a location of a characteristic identifier in the identifier sequence, and the second subscript is a characteristic identifier of characteristic data in a category to which the characteristic data belongs.

Further, for every two characteristic vectors in the five characteristic vectors, the characteristic interaction submodule 2031 may process, based on a category to which characteristic data indicated by the two characteristic vectors belongs, the two characteristic vectors by using one corresponding characteristic interaction model. For example, referring to Table 1, the characteristic interaction submodule 2031 may process characteristic vectors $v_{0,1}$ and $v_{1,30}$ by using the characteristic interaction model $\sigma_{0,1}$, to obtain a second contribution values $f_{0,1}$ of characteristic data indicated by the two characteristic vectors. Likewise, the characteristic interaction submodule 2031 may process every two other characteristic vectors by using a corresponding characteristic interaction model. Second contribution values that are finally obtained by the characteristic interaction submodule 2031 may be sequentially $f_{0,1}$, $f_{0,2}$, $f_{0,3}$, $f_{0,4}$, $f_{1,2}$, $f_{1,3}$, $f_{1,4}$, $f_{2,3}$, $f_{2,4}$, and $f_{3,4}$. Two subscript digits in the second contribution value may indicate categories to which two pieces of characteristic data corresponding to the second contribution value belong.

In this embodiment of the present invention, a second contribution value of different categories of characteristic data for the specified behavior is calculated, and an interaction impact of the characteristic data on execution of the specified behavior by the user is considered, so that a prediction effect of the behavior prediction model can be effectively improved.

Optionally, in this embodiment of the present invention, the characteristic interaction model of the behavior prediction model may be a kernel function σ, and a form of the kernel function σ may be a vector, a matrix, or a functional kernel. Kernel functions of different characteristic interaction models may have a same structure (for example, may be in a matrix form), but kernel functions of the different characteristic interaction models have different parameters. A parameter of each kernel function is obtained by pre-training the training sample data.

Figure 5:
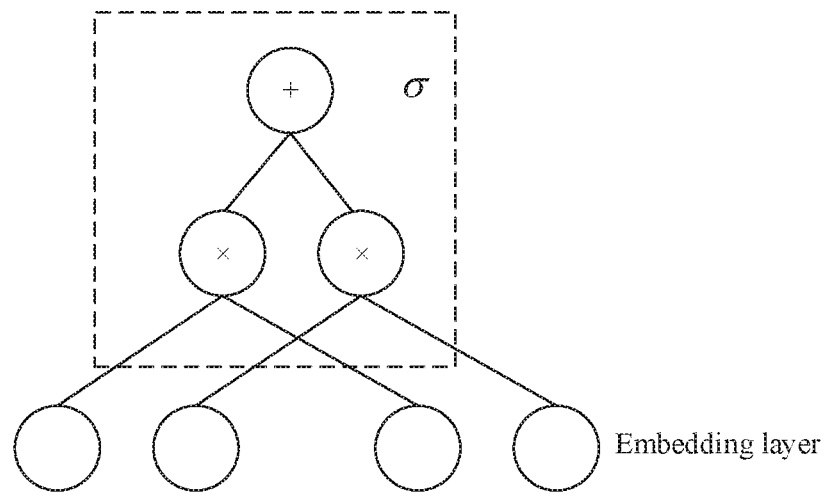
FIG. 5 is a schematic structural diagram of a kernel function according to an embodiment of the present invention.
Figure 6:
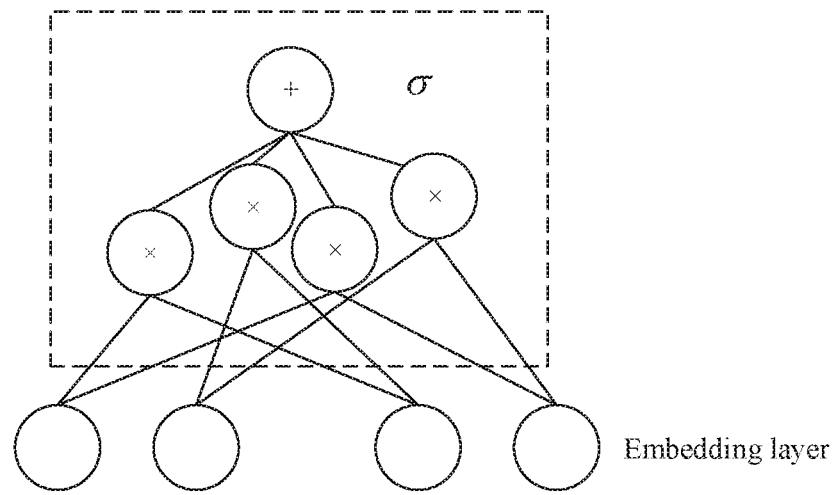
FIG. 6 is a schematic structural diagram of another kernel function according to an embodiment of the present invention.
Figure 7:
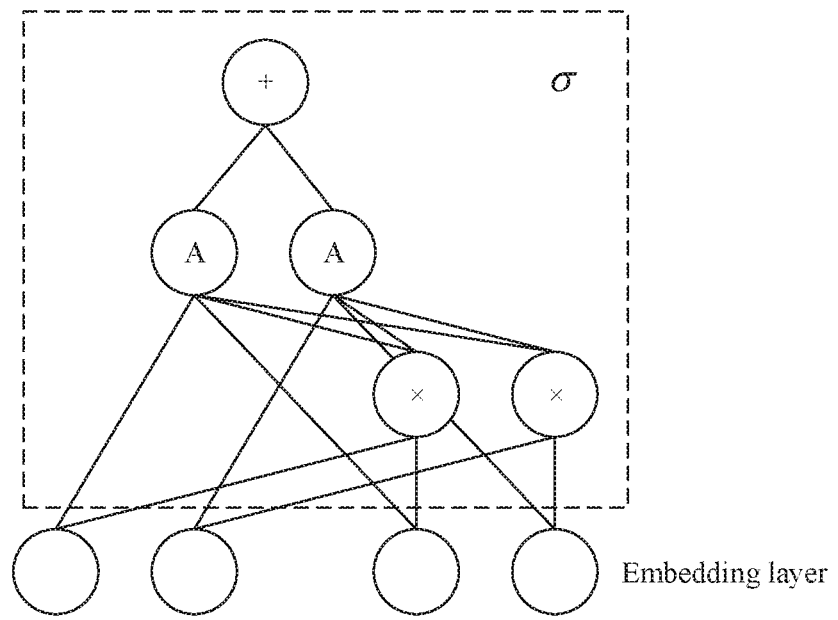
FIG. 7 is a schematic structural diagram of still another kernel function according to an embodiment of the present invention.

For example, as shown in FIG. 5, a kernel function σ in the characteristic interaction model may be a kernel vector. Alternatively, as shown in FIG. 6, the kernel function σ may be a kernel matrix. Alternatively, as shown in FIG. 7, the kernel function σ may be a functional kernel represented in a form of a neural network. In this embodiment of the present invention, the characteristic interaction model is implemented by calculating the kernel function instead of calculating only an inner product, and impact of each characteristic vector on execution of the specified behavior is calculated by mapping the characteristic vectors to different spaces, thereby effectively improving flexibility of implementing the characteristic interaction model. In addition, the kernel function has relatively diverse structures, so that accuracy of the second contribution value obtained through calculation by using the characteristic interaction model can be further improved.

Step 105: Determine a first comprehensive contribution value based on the obtained first contribution value of each piece of characteristic data.

The first comprehensive contribution value may be positively correlated with the first contribution value of each piece of characteristic data. That is, a larger first contribution value of each piece of characteristic data indicates a larger first comprehensive contribution value. In this embodiment of the present invention, a process of determining the first comprehensive contribution value may also be implemented by the width model module 202 of the behavior prediction model.

In an optional implementation, the behavior prediction model may perform summation on the obtained first contribution value of each characteristic data and a reference contribution value, to obtain the first comprehensive contribution value. The reference contribution value may be obtained by pre-training the sample characteristic data by the behavior prediction model, and the reference contribution value may also be a positive number not greater than 1. For example, the reference contribution value may be an output of the width model module 202 when no characteristic data is input.

For example, it is assumed that first contribution values that are of characteristic data and that are obtained by the behavior prediction model are $c_{0,1}$, $c_{1,30}$, $c_{2,12}$, $c_{3,1}$, and $c_{4,4}$, and the reference contribution value obtained through pre-training is $c_g$, the first comprehensive contribution value $out_1$ may meet the following formula:

$$out_1 = c_{0,1} + c_{1,30} + c_{2,12} + c_{3,1} + c_{4,4} + c_g.$$

In another optional implementation, the behavior prediction model may alternatively perform summation on the obtained first contribution value of each characteristic data directly, to obtain the first comprehensive contribution value. In other words, the behavior prediction model may not need to train and store the reference contribution value.

Step 106: Determine a second comprehensive contribution value based on the obtained second contribution value of the every N pieces of characteristic data.

In this embodiment of the present invention, a process of determining the second comprehensive contribution value may also be implemented by the characteristic interaction model module 203 of the behavior prediction model, for example, may be implemented by a comprehensive processing submodule 2032 of the characteristic interaction model module 203.

In an optional implementation, the behavior prediction model may directly perform summation on the obtained second contribution value of the every N pieces of characteristic data, to obtain the second comprehensive contribution value. The method for obtaining the second comprehensive contribution value is relatively simple, and calculation complexity is relatively low.

For example, it is assumed that N=2, and second contribution values that are output by 10 characteristic interaction models and that are obtained by the comprehensive processing submodule 2032 are sequentially $f_{0,1}$, $f_{0,2}$, $f_{0,3}$, $f_{0,4}$, $f_{1,2}$, $f_{1,3}$, $f_{1,4}$, $f_{2,3}$, $f_{2,4}$, and $f_{3,4}$. Therefore, the comprehensive processing submodule 2032 sums the foregoing second contribution values to obtain a second comprehensive contribution value $out_2$, which may meet the following formula:

$$out_2 = f_{0,1} + f_{0,2} + f_{0,3} + f_{0,4} + f_{1,2} + f_{1,3} + f_{1,4} + f_{2,3} + f_{2,4} + f_{3,4}.$$

In another optional implementation, the behavior prediction model may further input the obtained second contribution value of the every N pieces of characteristic data into the neural network, and use an output of the neural network as the second comprehensive contribution value. The second comprehensive contribution value is obtained by using a neural network obtained through pre-training, to ensure accuracy of the obtained second comprehensive contribution value, and further ensure a prediction effect of behavior prediction.

Optionally, the comprehensive processing submodule 2032 may be one neural network module. With reference to FIG. 3 and FIG. 4, after obtaining the second contribution value of the every N pieces of characteristic data, the characteristic interaction submodule 2031 may generate a characteristic interaction vector based on each second contribution value obtained by the characteristic interaction submodule 2031, and input the characteristic interaction vector into the neural network (for example, each second contribution value in the characteristic interaction vector may be input into one neural element at an input layer). A length of the characteristic interaction vector is $C_M^N$. For example, the characteristic interaction vector $V_f$ generated by the characteristic interaction submodule 2031 based on the second contribution value obtained by the characteristic interaction submodule 2031 may be:

$$V_f = [f_{0,1}, f_{0,2}, f_{0,3}, f_{0,4}, f_{1,2}, f_{1,3}, f_{1,4}, f_{2,3}, f_{2,4}, f_{3,4}].$$

The second contribution values in the characteristic interaction vector may be arranged based on orders in the identifier sequence that are of categories to which N pieces of characteristic data corresponding to the second contribution values belong. For example, categories to which two pieces of characteristic data corresponding to the second contribution value $f_{0,1}$ belong are located at first two locations in the identifier sequence. Therefore, the second contribution value $f_{0,1}$ may be used as the first value in the characteristic interaction vector. Categories to which two pieces of characteristic data corresponding to the second contribution value $f_{3,4}$ belong are located at last two locations in the identifier sequence. Therefore, the second contribution value $f_{3,4}$ may be used as the last value in the characteristic interaction vector.

Figure 8:
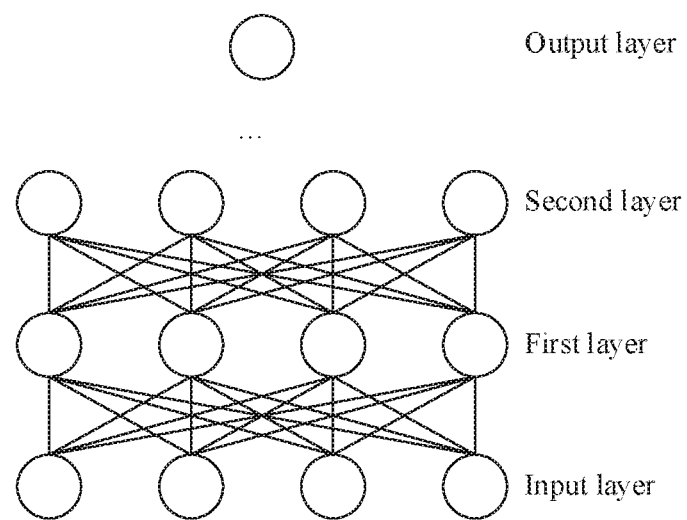
FIG. 8 is a schematic structural diagram of a neural network according to an embodiment of the present invention.

FIG. 8 is a schematic structural diagram of a neural network according to an embodiment of the present invention. Referring to FIG. 8, the neural network may be a multilayer neural network, each layer of neural network includes a plurality of neurons, and a weight and an offset that are between neurons located at adjacent layers may also be obtained through training. After obtaining the interaction characteristic vector, the neural network may calculate a value of each neural element layer by layer based on the weight and the offset that are between the neurons and that are obtained through training, and finally obtain a value of a neuron at an output layer through calculation.

As shown in FIG. 8, an input layer of the neural network is a bottom layer of the entire network, and the output layer is a top layer. Each layer of neuron in the neural network is connected to one or more neurons at an adjacent layer, and each link between two neurons includes a weight and an offset. When processing an input interaction characteristic vector, the neural network may perform calculation from a lower layer to an upper layer starting from the input layer. A value of each neuron is determined based on a value of a neuron that is at a next layer and that is connected to the neural. A contribution value of each lower-layer neuron to a neuron that is at an upper layer and that is connected to the lower-layer neuron is obtained after a value of the lower-layer neuron is multiplied by a weight of a corresponding link plus an offset. For each neuron, a value of the neuron may be obtained by obtaining a sum of contribution values of all lower-layer neurons connected to the neuron, and then multiplying the sum by an activation function (which is usually a nonlinear function for mapping all real numbers to a fixed interval, to ensure that the value of each neuron falls within a fixed range). The neural network may repeat the foregoing process until the value of the neuron at the output layer is obtained through calculation. The value is an output of the entire neural network, namely, the second comprehensive contribution value.

For example, it is assumed that a neuron at the $(h+1)^{th}$ layer is $r^{h+1}$, the neuron $r^{h+1}$ at the $(h+1)^{th}$ layer is connected to a neuron $r^h$ at the $h^{th}$ layer, a weight of a link between the neuron $r^{h+1}$ at the $(h+1)^{th}$ layer and the neuron $r^h$ at the $(h)^{th}$ layer is $W^h$, the offset is $b^h$, and A is an activation function. Therefore, a calculation formula of a value of the neuron $r^{h+1}$ at the $(h+1)^{th}$ layer in the neural network is as follows:

$$r^{h+1}=A(W^h r^h+b^h).$$

In the foregoing formula, both $r^{h+1}$ and $b^h$ may be a K×1 matrix, $r^h$ may be an L×1 matrix, $W^h$ may be a K×L matrix, K is a quantity of neurons included at the $(h+1)^{th}$ layer, and L is a quantity of neurons included at the $h^{th}$ layer. An element in the $k^{th}$ row and the $l^{th}$ column of $W^h$ (k is a positive integer not greater than K, and l is a positive integer not greater than L) is a weight of a link between the $k^{th}$ neuron at the $(h+1)^{th}$ layer and the $l^{th}$ neuron at the $h^{th}$ layer, and an element in the $k^{th}$ row in $b^h$ is an offset of the $k^{th}$ neuron at the $(h+1)^{th}$ layer.

For example, it is assumed that a first layer and a second layer in the neural network each include three neurons (in other words, W=L=3). Three neurons at the first layer are respectively x1, x2, and x3, and three neurons at the second layer are respectively y1, y2, and y3. Herein, $w_{kl}$ is used to represent a weight of a link between the $k^{th}$ neuron at the second layer and the $l^{th}$ neuron at the first layer, and $b_k$ is used to represent an offset of the $k^{th}$ neuron at the second layer. Therefore, values of the three neurons at the second layer are respectively as follows:

$$y1=A(x1*w_{11}+x2*w_{12}+x3*w_{13}+b_1);$$

$$y2=A(x1*w_{21}+x2*w_{22}+x3*w_{23}+b_2); \text{ and}$$

$$y3=A(x1*w_{31}+x2*w_{32}+x3*w_{33}+b_3).$$

The values of the three neurons at the second layer may be represented in a form of matrix multiplication as follows:

$$r^2 = \begin{bmatrix} y1 \\ y2 \\ y3 \end{bmatrix} = A\left(\begin{bmatrix} w_{11} & w_{12} & w_{13} \\ w_{21} & w_{22} & w_{23} \\ w_{31} & w_{32} & w_{33} \end{bmatrix}\begin{bmatrix} x1 \\ x2 \\ x3 \end{bmatrix} + \begin{bmatrix} b1 \\ b2 \\ b3 \end{bmatrix}\right).$$

Assuming that the neural network has H layers in total, a value (namely, the second comprehensive contribution value) $out_2$ of the neuron at the output layer may meet the following formula:

$$out_2=r^H=W^{H+1}r^{H-1}+b^{H-1}=W^{H-1}[A(W^{H-2}r^{H-2}+b^{H-2})]+b^{H-1}.$$

Herein, $r^{H-1}$ is a neuron at the $(H-1)^{th}$ layer, and $W^{H+1}$ and $b^{H-1}$ are respectively a weight and an offset of a link between the neuron at the $(H-1)^{th}$ layer and the neuron at the output layer. With reference to the foregoing formula, it can be learned that when the value of the neuron at the output layer is calculated, the activation function A does not need to be considered. That is, the activation function A needs to be multiplied only when a neuron at a network layer before the output layer is calculated.

Step 107: Perform weighted summation on the first comprehensive contribution value and the second comprehensive contribution value by using a preset weight value, to obtain an execution probability of the specified behavior.

The preset weight value is also obtained by the behavior prediction model by pre-training the sample characteristic data, and the preset weight value includes a weight of the first comprehensive contribution value and a weight of the second comprehensive contribution value. The execution probability is obtained through weighted summation, so that impact of individual characteristic data on the specified behavior and interaction impact of the plurality of pieces of characteristic data on the specified behavior can be better balanced, and a prediction effect of behavior prediction can be ensured.

For example, assuming that the weight of the first comprehensive contribution value is $k_1$, and the weight of the second comprehensive contribution value is $k_2$, an execution probability P that is of executing the specified behavior by the user and that is finally obtained by the behavior prediction model through calculation meets the following formula:

$$P=k_1 \times out_1+k_2\, out_2.$$

The execution probability P may also be referred to as a prediction score of the specified behavior. A higher execution probability P of the specified behavior indicates a higher probability that the user executes the specified behavior.

Optionally, a summation result obtained after weighted summation is performed on the first comprehensive contribution value and the second comprehensive contribution value may exceed a range of [0, 1]. Therefore, after the weighted summation is performed, if the summation result exceeds the range of [0, 1], a mapping function may be further used to process the summation result, to map the summation result to the interval of [0, 1]. The mapping function may be a sigmoid function, or another function having a similar function. This is not limited in this embodiment of the present invention.

In this embodiment of the present invention, for a plurality of candidate behaviors preconfigured in the object push system, the behavior prediction model may separately calculate, by using the method shown in the foregoing steps 101 to 107, an execution probability of executing each candidate behavior by the user, and may send a calculation result to the push model 30. The push model 30 may rank execution probabilities of the candidate behaviors in descending order, and push an execution object of a candidate behavior with a highest execution probability to the terminal, or may push execution objects of several candidate behaviors with top execution probabilities to the terminal.

In an optional application scenario, assuming that the object push system is a precise advertisement push system, the candidate behavior is a behavior of clicking an advertisement, and an execution object of the candidate behavior is the advertisement. If the precise advertisement push system pre-stores five candidate advertisements from an advertisement A to an advertisement E. and probabilities that are of clicking the five advertisements by the user and that are obtained by the behavior prediction model through calculation are sequentially 0.8, 0.5, 0.3, 0.6, and 0.4, the push model 30 may determine that there is a highest probability that the user clicks the advertisement A, and therefore may push the advertisement A to the terminal.

In another optional application scenario, it is assumed that the object push system is a personalized recommendation system, and the personalized recommendation system is deployed on the backend server of the application market. When the user starts the application program, namely, the application market, installed on the mobile phone, the application market may send a recommendation request to the backend server. After the personalized recommendation system deployed on the backend server receives the recommendation request, for a plurality of candidate application programs, for example, the application program 1 to the application program 10, the behavior prediction model of the personalized recommendation system may calculate a probability of downloading each candidate application program by the user. Then, the backend server may recommend several application programs with relatively high probabilities to the application market for display.

Optionally, in this embodiment of the present invention, in addition to an advertisement and an application program, an object pushed by the object push system may be a video, music, news, or the like. This is not limited in this embodiment of the present invention.

It should be noted that a sequence of steps of the behavior prediction method provided in this embodiment of the present invention may be properly adjusted, or a step may be correspondingly added or deleted based on a situation. For example, step 104 and step 103 may be performed synchronously, or step 102 may be deleted based on a situation. That is, the behavior prediction model may directly obtain the first contribution value and the second contribution value based on the received characteristic data. Any variation readily figured out by a person skilled in the art within the technical scope disclosed in this application shall fall within the protection scope of this application, and details are not described herein.

In conclusion, this embodiment of the present invention provides a behavior prediction method. In the method, when the execution probability of the specified behavior is predicted based on the obtained behavior prediction information, the first contribution value of each piece of characteristic data for the specified behavior may be calculated, and the second contribution value of the N pieces of characteristic data for the specified behavior may be calculated based on the characteristic interaction model. Because interaction impact of the plurality of pieces of characteristic data on the specified behavior is considered, behavior prediction accuracy is effectively improved. In addition, the characteristic interaction model corresponding to the every N pieces of characteristic data is determined based on the category to which the N pieces of characteristic data belong. That is, every N categories correspond to one characteristic interaction model. Therefore, not only a problem that a prediction result is poor because all characteristic data is processed by using a same characteristic interaction model can be avoided, but also a problem that calculation complexity is excessively high because the every N pieces of characteristic data each are processed by using an independent characteristic interaction models can be avoided. That is, according to the behavior prediction method provided in this embodiment of the present invention, a relatively good prediction effect can be achieved with relatively low calculation complexity.

Figure 9:
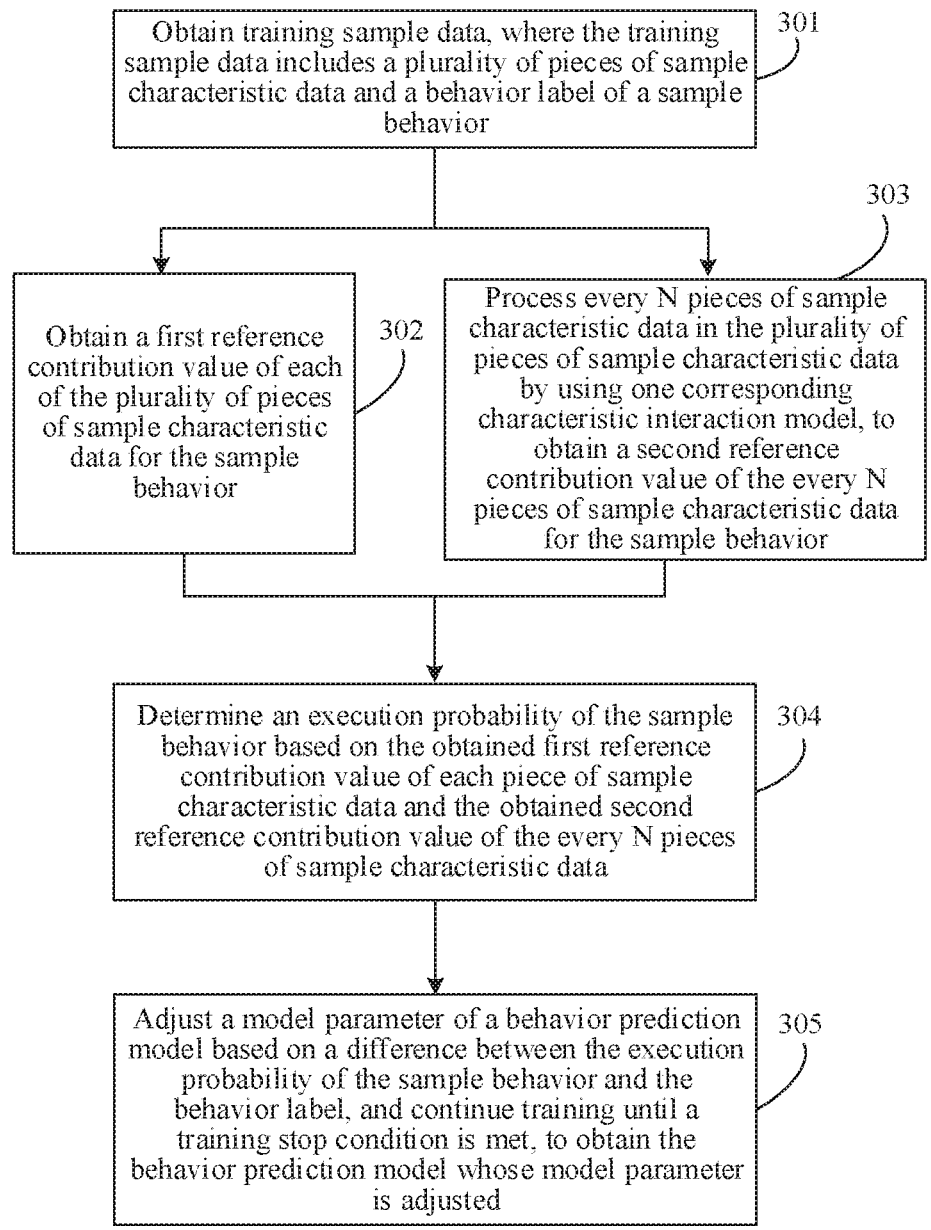
FIG. 9 is a flowchart of a behavior prediction model training method according to an embodiment of the present invention.

An embodiment of the present invention further provides a behavior prediction model training method. The training method may be used to train the behavior prediction model used in the foregoing method embodiment. The training method may be applied to the learning module 10 in the object push system shown in FIG. 1. Referring to FIG. 9, the method may include the following steps.

Step 301: Obtain training sample data, where the training sample data includes a plurality of pieces of sample characteristic data and a behavior label of a sample behavior.

As shown in FIG. 1, the training sample data may be historical behavior information that is of a user and that is obtained from a log file 40. In the training sample data, any two pieces of sample characteristic data belong to different categories. The behavior label may be used to indicate whether the user executes the sample behavior, and a value of the behavior label may be 0 or 1, 0 is used to indicate that the sample behavior is not executed, and 1 is used to indicate that the sample behavior is executed. Similar to behavior prediction information, the sample characteristic data in the training sample data may also include user attribute data, environment data, and attribute data of an execution object of the sample behavior.

For example, training sample data obtained by the learning module 10 may be Beijing, Tuesday, 17:00, fast food A, and 0. The training sample data may indicate that a user in Beijing does not click an advertisement of the fast food A after receiving the advertisement at 17:00 p.m. on Tuesday. A category to which Beijing belongs is a city in which the user is located, and Beijing is user attribute data, a category to which Tuesday belongs is a week, a category to which 17:00 belongs is a time, the two pieces of training samples each are environment data, and a category to which the fast food A belongs is an advertisement brand, and the fast food A is attribute data of an execution object.

Step 302: Obtain a first reference contribution value of each of the plurality of pieces of sample characteristic data for the sample behavior.

In this embodiment of the present invention, during initial training, the learning module 10 may store an initial reference contribution value corresponding to each piece of sample characteristic data, and the initial reference contribution value may be obtained through random initialization.

The learning module 10 may obtain, based on the correspondence, the first reference contribution value of each piece of sample characteristic data for the sample behavior.

Step 303: Process every N pieces of sample characteristic data in the plurality of pieces of sample characteristic data by using one corresponding characteristic interaction model, to obtain a second reference contribution value of the every N pieces of sample characteristic data for the sample behavior.

Optionally, the learning module 10 may store initial model parameters of a plurality of characteristic interaction models. Each characteristic interaction model may correspond to N categories, and categories corresponding to the characteristic interaction models are different from each other. In addition, initial model parameters of the characteristic interaction models may be the same or may be different. This is not limited in this embodiment of the present invention.

For the every N pieces of sample characteristic data in the plurality of pieces of sample characteristic data, the learning module 10 may determine, based on N categories to which the N pieces of sample characteristic data belong, one characteristic interaction model corresponding to the N categories, and process the N pieces of sample characteristic data by using the determined characteristic interaction model. If the training sample data includes M pieces of sample characteristic data, the learning module 10 may finally obtain $C_M^N$ second reference contribution values.

Step 304: Determine an execution probability of the sample behavior based on the obtained first reference contribution value of each piece of sample characteristic data and the obtained second reference contribution value of the every N pieces of sample characteristic data.

Optionally, the learning module 10 may add up the obtained first reference contribution value of each piece of sample characteristic data and the obtained second reference contribution value, to obtain the execution probability of the sample behavior.

Step 305: Adjust a model parameter of the behavior prediction model based on a difference between the execution probability of the sample behavior and the behavior label, and continue training until a training stop condition is met, to obtain the behavior prediction model whose model parameter is adjusted.

In this embodiment of the present invention, after determining the execution probability of the sample behavior, the learning module may obtain, through comparison, the difference between the execution probability and the behavior label recorded in the training sample data, and adjust the model parameter of the behavior prediction model based on the difference. The model parameter may include a model parameter of each characteristic interaction model and the first reference contribution value corresponding to each piece of sample characteristic data. The model parameter may include a parameter of a kernel function and a characteristic vector corresponding to a characteristic identifier of each piece of characteristic data.

The training stop condition may include: A quantity of times of iterative training reaches a specified quantity of times, or a difference between the execution probability and the behavior label is less than a specified difference threshold. After the training ends, the finally obtained behavior prediction model may include a plurality of characteristic interaction models. Each characteristic interaction model may correspond to N categories, and any two characteristic interaction models correspond to different categories.

Figure 10:
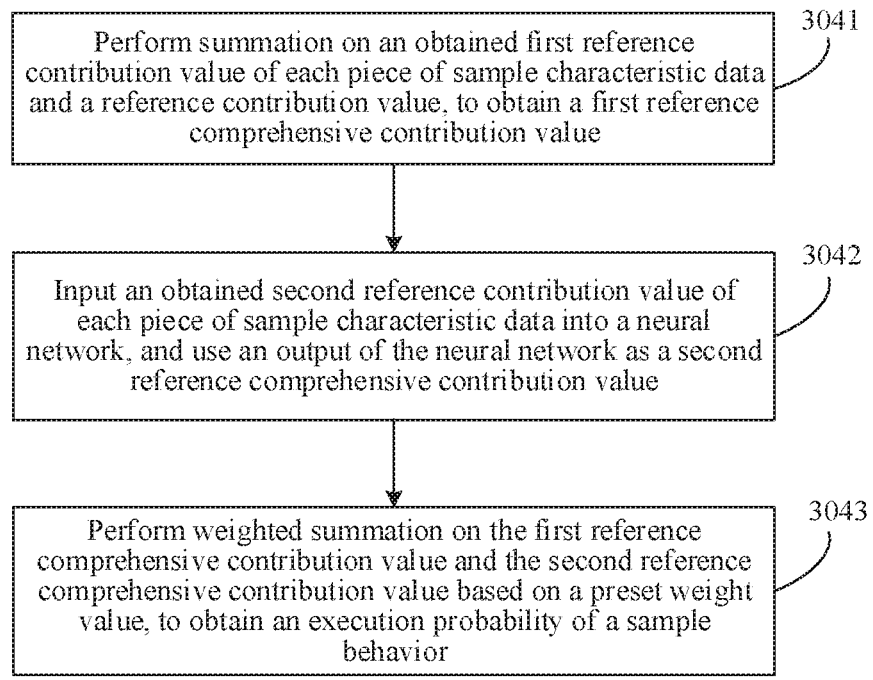
FIG. 10 is a flowchart of a method for determining an execution probability of a sample behavior according to an embodiment of the present invention.

Optionally, FIG. 10 is a flowchart of a method for determining an execution probability of a sample behavior according to an embodiment of the present invention. Referring to FIG. 10, the method may include the following steps.

Step 3041: Perform summation on the obtained first reference contribution value of each piece of sample characteristic data and a reference contribution value, to obtain a first reference comprehensive contribution value.

During initial training, the reference contribution value may be a preset value less than 1, for example, may be 0.

Step 3042: Input the obtained second reference contribution value of each piece of sample characteristic data into a neural network, and use an output of the neural network as a second reference comprehensive contribution value.

The neural network may be a multilayer neural network, and each layer includes a plurality of neurons. During initial training, a weight and an offset that are between neurons at adjacent layers each may be a preset initial value.

Step 3043: Perform weighted summation on the first reference comprehensive contribution value and the second reference comprehensive contribution value based on a preset weight value, to obtain the execution probability of the sample behavior.

Similarly, during initial training, the preset weight value may also be a preset fixed value. For example, during initial training, a weight of the first reference comprehensive contribution value and a weight of the second reference comprehensive contribution value each may be 0.5.

Correspondingly, in the foregoing step 305, the model parameter adjusted by the learning module 10 may further include at least the reference contribution value, a weight and an offset that are between neurons in the neural network, and the preset weight value.

Optionally, before step 302, the method may further include: determining a characteristic identifier of each of the plurality of pieces of sample characteristic data based on a correspondence between sample characteristic data and a characteristic identifier.

For a process of determining the characteristic identifier of the sample characteristic data, refer to the foregoing step 102. Details are not described herein again.

Correspondingly, step 302 may include:

determining, based on a correspondence between a characteristic identifier and the reference contribution value, a first reference contribution value corresponding to the characteristic identifier of each of the plurality of pieces of sample characteristic data.

Correspondingly, step 303 may include the following steps:

Step 3031: Obtain a characteristic vector corresponding to a characteristic identifier of each of the every N pieces of sample characteristic data, where characteristic vectors corresponding to the characteristic identifiers have an equal length.

Step 3032: Process the obtained N characteristic vectors by using one characteristic interaction model corresponding to N categories to which the every N pieces of sample characteristic data belong, to obtain the second contribution value of the every N pieces of sample characteristic data for the sample behavior.

Therefore, in the foregoing step 305, the model parameter of the behavior prediction model that is adjusted based on the difference may further include a characteristic vector corresponding to each characteristic identifier.

It should be noted that, to ensure performance of the behavior prediction model obtained through training, the learning module needs to train a large amount of training sample data. For a process of training each piece of training sample data, refer to the foregoing step 301 to step 305. Details are not described herein again. In addition, for specific implementation processes of the foregoing step 301 to step 305 and step 3041 to step 3043, refer to corresponding steps in the embodiment shown in FIG. 2. Details are not described herein again.

According to the method provided in this embodiment of the present invention, when the behavior prediction model is trained, one corresponding characteristic interaction model may be established for every N categories in characteristic data. If a same characteristic interaction model is established for a plurality of any categories of characteristic data, model training efficiency can be effectively improved, but an effect of the characteristic interaction model is relatively poor, and an interaction characteristic between different categories of characteristic data cannot be effectively expressed. If an independent characteristic interaction model is established for every N pieces of characteristic data, an interaction characteristic between characteristic data can be fully expressed, but a quantity of parameters in the characteristic interaction model is greatly increased, and model complexity and training difficulty are greatly increased.

For example, it is assumed that there are a total of M categories of sample characteristic data. If one corresponding characteristic interaction model is established for every two categories (that is, N=2), a quantity of characteristic interaction models that need to be established is that $C_M^2 = M \times (M-1)/2$. If total quantities of sample characteristic data included in all of the M categories of sample characteristic data are sequentially $n_1, n_2, \ldots, n_M$, a quantity of characteristic interaction models that need to be established is $$C_{n_1+n_2+\ldots+n_M}^2 - \sum_{m=1}^{M} \frac{n_m \times (n_m - 1)}{2},$$

where $n_m$ is a total amount of sample characteristic data included in the $m^{th}$ (m is a positive integer not greater than M) category of sample characteristic data in the M categories of sample characteristic data. It can be learned from this that if one characteristic interaction model is established for every two pieces of characteristic data, model training complexity is significantly increased, and model training efficiency is reduced.

For example, it is assumed that categories of the training sample data are a gender, an advertisement brand, and a week, that is, M=3. If the method provided in this embodiment of the present invention is used, and N=2, only one corresponding characteristic interaction model needs to be established for each of a pair of the gender and the advertisement brand, a pair of the gender and the week, and a pair of the advertisement brand and the week, and there are three characteristic interaction models. However, if one corresponding characteristic interaction model needs to be established for every two pieces of characteristic data, because in the gender category, the characteristic data includes two categories: a male category and a female category, that is, there are two pieces of the characteristic data in total; in the week category, the characteristic data includes Monday to Sunday, and there are seven pieces of characteristic data in total, and it is assumed that in the advertisement brand category, there are five pieces of characteristic data, during modeling, one corresponding characteristic interaction model needs to be established for the female and Monday, one corresponding characteristic interaction model needs to be established for the male and Monday, one corresponding characteristic interaction model needs to be established for the female and Tuesday, and so on. A quantity of characteristic interaction models that need to be established is that $C_{2+7+5}^2 - 1 - 5 \times 4/2 - 7 \times 6/2 = 59$.

It can be learned from the foregoing analysis that, according to the method provided in this embodiment of the present invention, a corresponding characteristic interaction model is established for different categories of characteristic data, so that a contradiction relationship between the prediction effect of the behavior prediction model and complexity can be better resolved. In addition, according to the training method provided in this embodiment of the present invention, one corresponding characteristic interaction model may be established for every N categories. Therefore, explicit modeling for characteristic interaction between a plurality of pieces of characteristic data is implemented. Compared with implicit modeling, the explicit modeling can better explain and represent interaction between different characteristic data.

In this embodiment of the present invention, a prediction effect of the behavior prediction model provided in this application is further compared with a prediction effect of a prediction model in a related technology. In a comparison process, four datasets commonly used in the behavior prediction method are used, to-be-compared objects include an LR model, a factorization machine (FM) model, a field-aware factorization machine (FFM) model, a deep neural network DNN) model, an attentional factorization machine (AFM) model, and a factorization machine-based deep learning (DeepFM) model.

In the four datasets used in the comparison process, the first dataset includes a large quantity of advertisement click records of a user in one month. In this embodiment of the present invention, an advertisement click record in one day is used as a training set, and an advertisement click record in another day is used as a test set. In addition, a negative sample (namely, a sample whose behavior label is used to indicate an advertisement that is not clicked) in the training set is down-sampled, so that a final ratio of positive samples to negative samples in the training set is 1:1. For the second dataset, in this embodiment of the present invention, 80% data is randomly selected as a training set, and remaining 20% data is used as a test set. In addition, a category that appears less than 20 times in the training set is deleted. The third dataset includes a training set and a test set, and therefore can be directly used in the comparison process. The fourth dataset is a dataset for downloading game application programs from the application market.

The behavior prediction model provided in this embodiment of the present invention may be referred to as a product network-based neural network (PIN) model. In the comparison process, the PIN model and each model in the LR model, the FM model, the FFM model, the DNN model, the AFM model, and the DeepFM model in the related technology needs to be separately trained by using a training set provided by each of the foregoing four data sets, and then behavior prediction is performed on the test set provided by each dataset. A prediction result is measured by an area under a receiver operating characteristic curve (ROC curve) AUC (Area Under Curve) and a logarithmic loss (Logloss). A value of the AUC is positively correlated with accuracy of the prediction result. That is, a larger value of the AUC indicates a better prediction effect. A value of the logloss is negatively correlated with accuracy of the prediction result. That is, a smaller value of the logloss indicates a better prediction effect.

Prediction results of the behavior prediction model provided in this embodiment of the present invention and prediction results of each model in the related technology in the four datasets are shown in the following Table 2. With reference to Table 2, it can be learned that after the DeepFM model predicts the training set in the first data set, the AUC is 79.91%, and the logloss is 0.5423. However, after the behavior prediction model PIN model provided in this embodiment of this application predicts the training set in the first data set, the AUC is 80.21%, and the Logloss is 0.5390. It can be learned from Table 2 that a prediction effect of the behavior prediction model provided in this embodiment of the present invention in each data set is better than that of the other models.

TABLE 2

| Model | First dataset | | Second dataset | | Third dataset | | Fourth dataset | |
|---|---|---|---|---|---|---|---|---|
| | AUC (%) | Logloss | AUC (%) | Logloss | AUC (%) | Logloss | AUC (%) | Logloss |
| LR | 78.00 | 0.5631 | 76.76 | 0.3868 | 76.38 | 0.005691 | 86.40 | 0.02648 |
| FM | 79.09 | 0.5500 | 77.93 | 0.3805 | 77.17 | 0.005595 | 86.78 | 0.02633 |
| FFM | 79.80 | 0.5438 | 78.31 | 0.3781 | 76.18 | 0.005695 | 87.04 | 0.02626 |
| DNN | 79.87 | 0.5428 | 78.30 | 0.3778 | 77.82 | 0.005573 | 86.83 | 0.2629 |
| AFM | 79.13 | 0.5517 | 78.06 | 0.3794 | 77.71 | 0.005562 | 86.89 | 0.02649 |
| DeepFM | 79.91 | 0.5423 | 78.36 | 0.3777 | 77.92 | 0.005588 | 87.15 | 0 02618 |
| PIN | 80.21 | 0.5390 | 78.72 | 0.3755 | 78.22 | 0.005547 | 87.30 | 0.02614 |

In addition, by comparing all prediction results, it can be further learned that, compared with the DeepFM model that is ranked the second, the behavior prediction model provided in this application has an increase of 0.15% to 0.3% in the AUC. However, usually, a small increase in the AUC can greatly increase a click-through rate (CTR). For example, if the AUC is increased by 0.275%, the CTR may be increased by about 3.9%. A CTR increase rate of 3.9% may bring relatively high benefits to an object provider.

Further, complexity of each model is analyzed. It is assumed that a size of an embedding layer of each model is L (that is, the embedding layer may convert a characteristic identifier into a characteristic vector whose length is L), there are M categories of sample characteristic data, and each category includes n pieces of characteristic data in total. Therefore, a parameter quantity of the FM model in the related technology is O(Ln), and a parameter quantity of the FFM model is O(nLM). However, a parameter quantity of the PIN model provided in this embodiment of the present invention is O(Ln+M*(M−1)/2*q). Herein, O( ) may also be understood as space complexity, namely, an order of magnitude of memory space consumed during model training; and q is a quantity of parameters included in the characteristic interaction model (for example, a kernel function) of the behavior prediction model provided in this embodiment of the present invention. In an actual application, a value of n is usually relatively large, but a value of q is relatively small. Therefore, a quantity of parameters of the PIN model provided in this embodiment of the present invention is much less than a quantity of parameters of the FFM model.

Table 3 is a comparison table of parameter quantities required when models train a same training set according to this embodiment of the present invention. In the comparison table, a memory occupied by a parameter is used as a measurement standard of the parameter quantity. With reference to FIG. 3, it can be learned that a memory occupied by parameters required by the LR model is $1 \times 10^6$ bytes, a memory occupied by parameters required by the FFM model is greater than or equal to $40 \times 10^6$ bytes, a memory occupied by parameters required by the PIN model provided in this embodiment of the present invention is $26.48 \times 10^6$ bytes, and the parameter quantity of the PIN model is much smaller than that of the FFM model.

TABLE 3

| Model | LR | DNN | FM | FFM | PIN |
|---|---|---|---|---|---|
| Parameter quantity ($10^6$) | 1 | 22.51 | 21 | ≥40 | 26.48 |

It should be noted that the behavior prediction model training method provided in this embodiment of the present invention may be performed before step 101 in the embodiment shown in FIG. 2. Alternatively, the method may be performed after step 107. That is, after the behavior prediction model determines the execution probability, the learning module may determine the behavior label of the specified behavior based on a behavior actually executed by a user, generate the training sample data based on the behavior prediction information and the behavior label, and continue to train the newly generated training sample data in the method shown in the foregoing step 301 to step 305.

In conclusion, this embodiment of the present invention provides a behavior prediction model training method. In the method, when training sample data is trained, for the every N pieces of sample characteristic data, the second contribution value of the N pieces of sample characteristic data may be calculated based on a category to which the N pieces of sample characteristic data belong and by using one corresponding characteristic interaction model. The behavior prediction model obtained through training in this way may include a plurality of characteristic interaction models, and each characteristic interaction model may correspond to N categories. When the behavior prediction model is used to perform behavior prediction, interaction impact of the N pieces of characteristic data on the specified behavior may be considered, and therefore, prediction accuracy can be effectively improved. In addition, because every N categories correspond to one characteristic interaction model during model training, not only a problem that a prediction result is poor because all sample characteristic data is processed by using a same characteristic interaction model can be avoided, but also a problem that calculation complexity is excessively high because the every N pieces of sample characteristic data each are processed by using an independent characteristic interaction model can be avoided. That is, according to the training method provided in this embodiment of the present invention, a relatively good prediction effect can be achieved with relatively low calculation complexity, so that an actual deployment requirement can be met.

Figure 11:
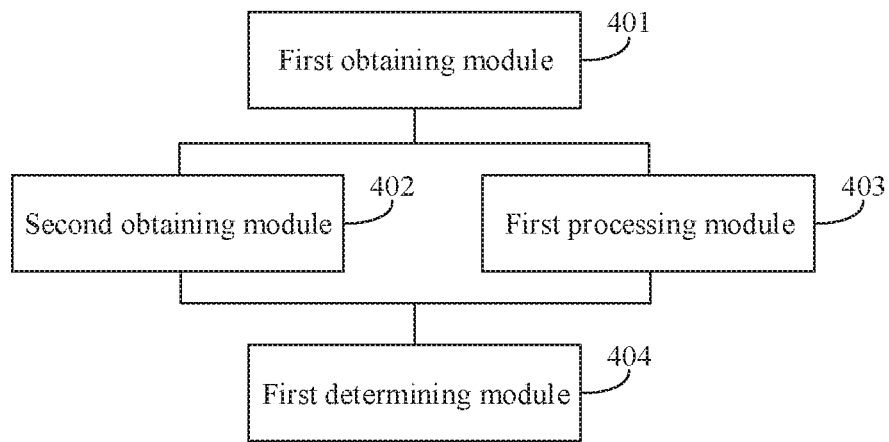
FIG. 11 is a schematic structural diagram of a user behavior prediction apparatus according to an embodiment of the present invention.

FIG. 11 is a schematic structural diagram of a user behavior prediction apparatus according to an embodiment of the present invention. The apparatus may be applied to the object push system shown in FIG. 1. Referring to FIG. 11, the apparatus may include a first obtaining module 401, a second obtaining module 402, a first processing module 403, and a first determining module 404.

The first obtaining module 401 may be configured to implement the method shown in step 101 in the foregoing method embodiments.

The second obtaining module 402 may be configured to implement the method shown in step 103 in the foregoing method embodiments.

The first processing module 403 may be configured to implement the method shown in step 104 in the foregoing method embodiments.

The first determining module 404 is configured to determine an execution probability of a specified behavior based on an obtained first contribution value of each piece of characteristic data and an obtained second contribution value of every N pieces of characteristic data.

Figure 12:
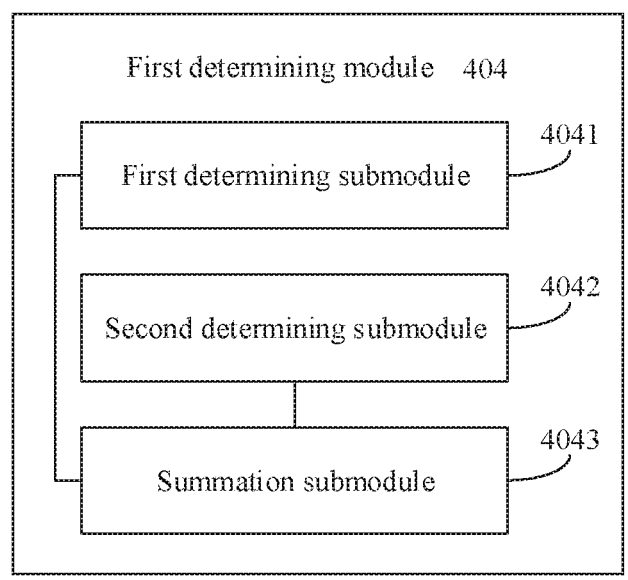
FIG. 12 is a schematic structural diagram of a first determining module according to an embodiment of the present invention.

FIG. 12 is a schematic structural diagram of a first determining module 404 according to an embodiment of the present invention. As shown in FIG. 12, the first determining module 404 may include a first determining submodule 4041, a second determining submodule 4042, and a first summation submodule 4043.

The first processing submodule 4041 may be configured to implement the method shown in step 105 in the foregoing method embodiments.

The second determining submodule 4042 may be configured to implement the method shown in step 106 in the foregoing method embodiments.

The first summation submodule 4043 may be configured to implement the method shown in step 107 in the foregoing method embodiments.

Optionally, the second determining submodule 4042 may be configured to:

perform summation on the obtained second contribution value of the every N pieces of characteristic data, to obtain the second comprehensive contribution value; or input the obtained second contribution value of the every N pieces of characteristic data into a neural network, and use an output of the neural network as the second comprehensive contribution value.

Optionally, the first determining submodule 4041 may be configured to:

perform summation on the obtained first contribution value of each piece of characteristic data and a reference contribution value, to obtain the first comprehensive contribution value.

Figure 13:
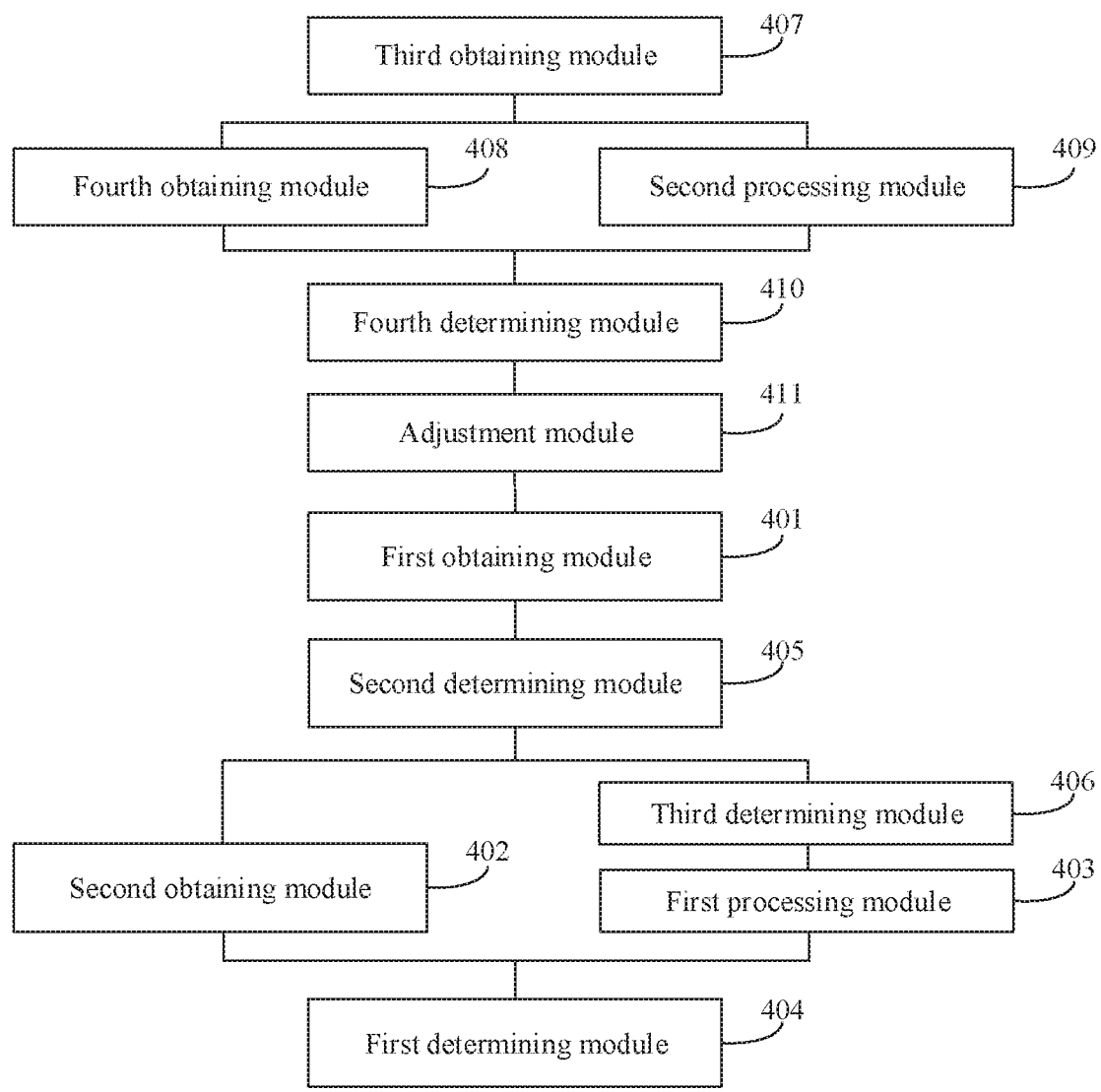
FIG. 13 is a schematic structural diagram of another user behavior prediction apparatus according to an embodiment of the present invention.

FIG. 13 is a schematic structural diagram of another user behavior prediction apparatus according to an embodiment of the present invention. As shown in FIG. 13, the apparatus may further include a second determining module 405.

The second determining module 405 may be configured to implement the method shown in step 102 in the foregoing method embodiments.

Correspondingly, the second obtaining module 402 may be configured to:

determine, based on a correspondence between a characteristic identifier and a contribution value, a first contribution value corresponding to a characteristic identifier of each of the plurality of pieces of characteristic data.

Correspondingly, the first obtaining module 403 may be configured to:

separately obtain a characteristic vector corresponding to a characteristic identifier of each of the every N pieces of characteristic data; and process the obtained N characteristic vectors by using one characteristic interaction model corresponding to N categories to which the every N pieces of characteristic data belong, to obtain the second contribution value of the every N pieces of characteristic data for the specified behavior.

Still referring to FIG. 13, the apparatus may further include:

a third determining module 406, configured to: before the first processing module 403 processes the every N pieces of characteristic data in the plurality of pieces of characteristic data by using one corresponding characteristic interaction model, determine one corresponding characteristic interaction model for the every N pieces of characteristic data in the plurality of pieces of characteristic data based on a correspondence between a characteristic interaction model and a category.

The correspondence may include a plurality of characteristic interaction models, each characteristic interaction model may correspond to N categories, and any two characteristic interaction models correspond to different categories.

Optionally, the first contribution value, the second contribution value, and the execution probability may be all obtained by a behavior prediction model. As shown in FIG. 13, the apparatus may further include a third obtaining module 407, a fourth obtaining module 408, a second processing module 409, a fourth determining module 410, and an adjustment module 411.

The third obtaining module 407 may be configured to implement the method shown in step 301 in the foregoing method embodiments.

The fourth obtaining module 408 may be configured to implement the method shown in step 302 in the foregoing method embodiments.

The second processing module 409 may be configured to implement the method shown in step 303 in the foregoing method embodiments.

The fourth determining module 410 may be configured to implement the method shown in step 304 in the foregoing method embodiments.

The adjustment module 411 may be configured to implement the method shown in step 305 in the foregoing method embodiments.

Optionally, the fourth determining module 410 may be configured to implement the method shown in step 3041 to step 3043 in the foregoing method embodiments.

Optionally, the characteristic interaction model may include a kernel function, where N may be 2. The behavior prediction information may include user attribute data, current environment data, and attribute data of an execution object of the specified behavior.

In conclusion, this embodiment of the present invention provides a behavior prediction apparatus. When predicting the execution probability of the specified behavior based on the obtained behavior prediction information, the apparatus may calculate the first contribution value of each piece of characteristic data for the specified behavior, and may calculate the second contribution value of the N pieces of characteristic data for the specified behavior based on the characteristic interaction model. Interaction impact of the plurality of pieces of characteristic data on the specified behavior is considered, and therefore, behavior prediction accuracy is effectively improved. In addition, the characteristic interaction model corresponding to the every N pieces of characteristic data is determined based on a category to which the N pieces of characteristic data belong. That is, every N categories correspond to one characteristic interaction model. Therefore, not only a problem that a prediction result is poor because all characteristic data is processed by using a same characteristic interaction model can be avoided, but also a problem that calculation complexity is excessively high because the every N pieces of characteristic data each are processed by using an independent characteristic interaction model can be avoided. That is, the behavior prediction apparatus provided in this embodiment of the present invention can achieve a relatively good prediction effect with relatively low calculation complexity.

Figure 14:
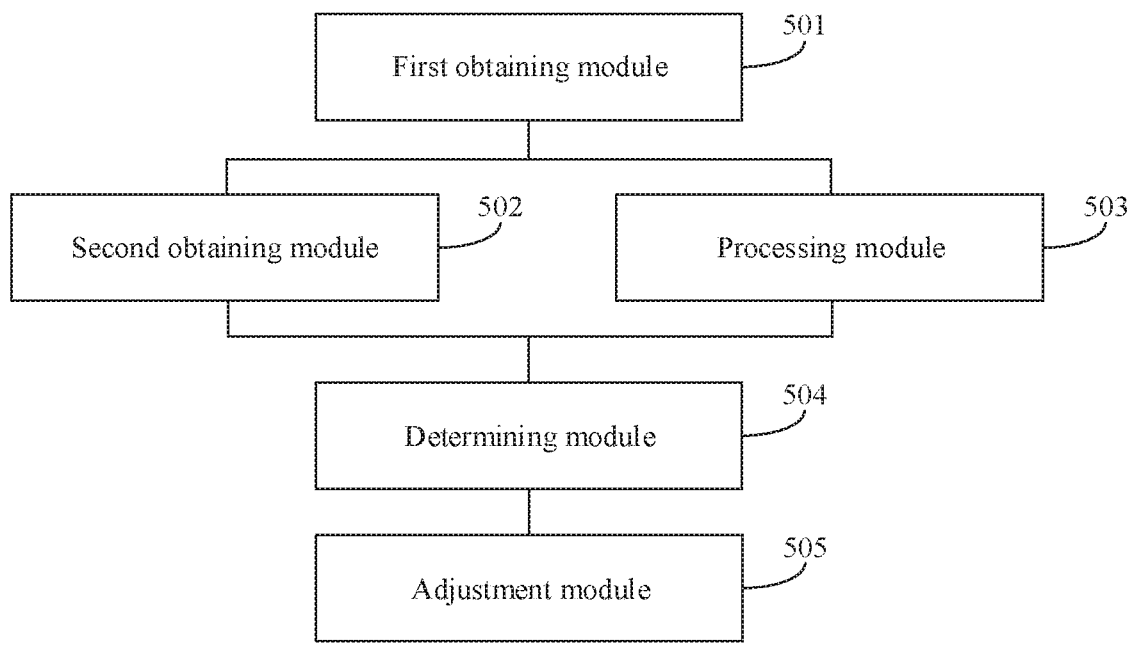
FIG. 14 is a schematic structural diagram of a behavior prediction model training apparatus according to an embodiment of the present invention.

FIG. 14 is a schematic structural diagram of a behavior prediction model training apparatus according to an embodiment of the present invention. The apparatus may be applied to the object push system shown in FIG. 1. The behavior prediction model may include a plurality of characteristic interaction models. Each characteristic interaction model corresponds to N categories, and any two characteristic interaction models correspond to different categories. The category is a category of sample characteristic data in training sample data. Referring to FIG. 14, the apparatus may include a first obtaining module 501, a second obtaining module 502, a processing module 503, a determining module 504, and an adjustment module 505.

The first obtaining module 501 may be configured to implement the method shown in step 301 in the foregoing method embodiments.

The second obtaining module 502 may be configured to implement the method shown in step 302 in the foregoing method embodiments.

The processing module 503 may be configured to implement the method shown in step 303 in the foregoing method embodiments.

The determining module 504 may be configured to implement the method shown in step 304 in the foregoing method embodiments.

The adjustment module 505 may be configured to implement the method shown in step 305 in the foregoing method embodiments.

Optionally, the determining module 504 may be configured to implement the method shown in step 3041 to step 3043 in the foregoing method embodiments.

In conclusion, this embodiment of the present invention provides a behavior prediction model training apparatus. When training training sample data, the apparatus may calculate a second contribution value of every N pieces of sample characteristic data based on a category to which the N pieces of sample characteristic data belong and by using one corresponding characteristic interaction model. Therefore, the behavior prediction model obtained through training may include a plurality of characteristic interaction models, and each characteristic interaction model may correspond to N categories. When the behavior prediction model is used to perform behavior prediction, interaction impact of the N pieces of characteristic data on the specified behavior may be considered, and therefore, prediction accuracy can be effectively improved. In addition, because every N categories correspond to one characteristic interaction model during model training, not only a problem that a prediction result is poor because all sample characteristic data is processed by using a same characteristic interaction model can be avoided, but also a problem that calculation complexity is excessively high because the every N pieces of sample characteristic data each are processed by using an independent characteristic interaction model can be avoided. That is, the training apparatus provided in this embodiment of the present invention can achieve a relatively good prediction effect with relatively low calculation complexity, so that an actual deployment requirement can be met.

It may be clearly understood by persons skilled in the art that, for the purpose of convenient and brief description, for a detailed working process of the foregoing apparatus and module, reference may be made to a corresponding process in the foregoing method embodiments, and details are not described herein.

Figure 15:
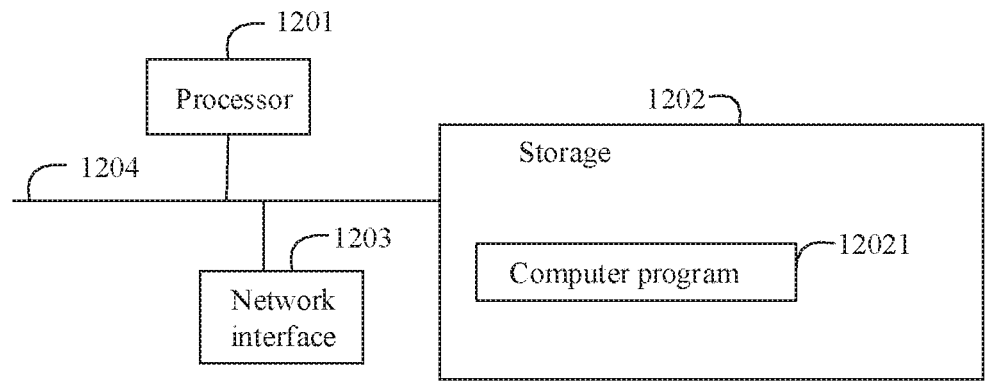
FIG. 15 is a schematic structural diagram of a server according to an embodiment of the present invention.

FIG. 15 is a schematic structural diagram of a server according to an embodiment of the present invention. As shown in FIG. 15, the server may include a processor 1201 (for example, a CPU), a storage 1202, a network interface 1203, and a bus 1204. The bus 1204 is configured to connect the processor 1201, the storage 1202, and the network interface 1203. The storage 1202 may include a random access memory (RAM), or may include a nonvolatile memory, for example, at least one magnetic disk storage. A communication connection between a server and a communications device is implemented by using the network interface 1203 (which may be wired or wireless). The storage 1202 stores a computer program 12021. The computer program 12021 is configured to implement various application functions. The processor 1201 is configured to execute the computer program 12021 stored in the storage 1202, to implement the user behavior prediction method or the behavior prediction model training method provided in the foregoing method embodiments.

An embodiment of the present invention further provides a computer readable storage medium. The computer readable storage medium stores an instruction. When the computer readable storage medium runs on a computer, the computer is enabled to perform the user behavior prediction method or the behavior prediction model training method provided in the foregoing method embodiments.

An embodiment of the present invention further provides a computer program product including an instruction. When the computer program product runs on a computer, the computer is enabled to perform the user behavior prediction method or the behavior prediction model training method provided in the foregoing method embodiments.

All or some of the foregoing embodiments may be implemented by using software, hardware, firmware, or any combination thereof. When the embodiments are implemented by using software, all or some of the embodiments may be implemented in a form of a computer program product. The computer program product includes one or more computer instructions. When the computer program instruction is loaded and executed on a computer, all or some of the processes or functions according to the embodiments of the present invention are generated. The computer may be a general-purpose computer, a computer network, or another programmable apparatus. The computer instruction may be stored in a computer readable storage medium, or transmitted from one computer readable storage medium to another computer readable storage medium. For example, the computer instruction may be transmitted from one website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any available medium accessible to a computer, or a data storage device, such as a server or a data center, integrating one or more available media. The available medium may be a magnetic medium (for example, a floppy disk, a hard disk, or a magnetic tape), an optical medium, a semiconductor medium (for example, a solid-state drive), or the like.

The foregoing descriptions are merely optional embodiments of this application, but are not intended to limit this application. Any modification, equivalent replacement, improvement or the like made without departing from the spirit and principle of this application shall fall within the protection scope of this application.

What is claimed is:

1. A user behavior prediction method, wherein the method comprises:

obtaining, by a computer, behavior prediction information that is used to predict a specified behavior, wherein the behavior prediction information comprises a plurality of pieces of characteristic data, and wherein any two pieces of the characteristic data belong to different categories;

obtaining, by the computer, a first contribution value of each of the plurality of pieces of characteristic data for the specified behavior, wherein the first contribution value is used to indicate a degree of impact on execution of the specified behavior, and wherein the first contribution value is positively correlated with the degree of impact;

processing, by the computer, every N pieces of the characteristic data in the plurality of pieces of characteristic data by using one corresponding characteristic interaction model, to obtain a second contribution value of the every N pieces of the characteristic data for the specified behavior, wherein N is an integer greater than 1, wherein one characteristic interaction model corresponding to any N pieces of the characteristic data is determined based on N categories to which the any N pieces of the characteristic data belong, wherein the second contribution value is used to indicate a degree of impact on execution of the specified behavior, and wherein the second contribution value is positively correlated with the degree of impact; and determining, by the computer, an execution probability of the specified behavior based on the obtained first contribution value of each piece of the characteristic data and the obtained second contribution value of the every N pieces of the characteristic data.

2. The method according to claim 1, wherein the determining, by the computer, an execution probability of the specified behavior based on the obtained first contribution value of each piece of the characteristic data and the obtained second contribution value of the every N pieces of the characteristic data comprises:

determining, by the computer, a first comprehensive contribution value based on the obtained first contribution value of each piece of the characteristic data;

determining, by the computer, a second comprehensive contribution value based on the obtained second contribution value of the every N pieces of the characteristic data; and performing, by the computer, weighted summation on the first comprehensive contribution value and the second comprehensive contribution value by using a preset weight value, to obtain the execution probability.

3. The method according to claim 2, wherein the determining, by the computer, a second comprehensive contribution value based on the obtained second contribution value of the every N pieces of the characteristic data comprises:

performing, by the computer, summation on the obtained second contribution value of the every N pieces of the characteristic data, to obtain the second comprehensive contribution value; or inputting, by the computer, each obtained second contribution value of the every N pieces of the characteristic data into a neural network, and using an output of the neural network as the second comprehensive contribution value.

4. The method according to claim 2, wherein the determining, by the computer, a first comprehensive contribution value based on the obtained first contribution value of each piece of the characteristic data comprises:

performing, by the computer, summation on the obtained first contribution value of each piece of the characteristic data and a reference contribution value, to obtain the first comprehensive contribution value.

5. The method according to claim 1, wherein before the obtaining, by the computer, a first contribution value of each of the plurality of pieces of characteristic data for the specified behavior, the method further comprises:

determining, by the computer, a characteristic identifier of each of the plurality of pieces of characteristic data based on a correspondence between the characteristic data and a characteristic identifier; and wherein the obtaining, by the computer, a first contribution value of each of the plurality of pieces of characteristic data for the specified behavior comprises:

determining, by the computer and based on a correspondence between a characteristic identifier and a contribution value, a first contribution value corresponding to the characteristic identifier of each of the plurality of pieces of characteristic data.

6. The method according to claim 1, wherein before the obtaining, by the computer, a first contribution value of each of the plurality of pieces of characteristic data for the specified behavior, the method further comprises:

determining, by the computer, a characteristic identifier of each of the plurality of pieces of characteristic data based on a correspondence between characteristic data and a characteristic identifier; and wherein the processing, by the computer, every N pieces of the characteristic data in the plurality of pieces of characteristic data by using one corresponding characteristic interaction model, to obtain a second contribution value of the every N pieces of the characteristic data for the specified behavior comprises:

obtaining, by the computer, a characteristic vector corresponding to the characteristic identifier of each of the every N pieces of the characteristic data, wherein characteristic vectors corresponding to all the characteristic identifiers have an equal length; and processing, by the computer, the obtained N characteristic vectors by using one characteristic interaction model corresponding to N categories to which the every N pieces of the characteristic data belong, to obtain the second contribution value of the every N pieces of the characteristic data for the specified behavior.

7. The method according to claim 1, wherein before the processing, by the computer, every N pieces of the characteristic data in the plurality of pieces of characteristic data by using one corresponding characteristic interaction model, the method further comprises:

determining, by the computer, one corresponding characteristic interaction model for the every N pieces of the characteristic data in the plurality of pieces of characteristic data based on a correspondence between a characteristic interaction model and a category, wherein the correspondence comprises a plurality of characteristic interaction models, wherein each characteristic interaction model corresponds to N categories, and wherein any two characteristic interaction models correspond to different categories.

8. The method according to claim 1, wherein the first contribution value, the second contribution value, and the execution probability are all obtained by a behavior prediction model, and wherein the method further comprises:
  obtaining, by the computer, training sample data, wherein the training sample data comprises a plurality of pieces of sample characteristic data and a behavior label of a sample behavior, wherein any two pieces of sample characteristic data belong to different categories, and wherein the behavior label is used to indicate whether a user executes the sample behavior;
  obtaining, by the computer, a first reference contribution value of each of the plurality of pieces of sample characteristic data for the sample behavior;
  processing, by the computer, every N pieces of the sample characteristic data in the plurality of pieces of sample characteristic data by using one corresponding characteristic interaction model, to obtain a second reference contribution value of the every N pieces of the sample characteristic data for the sample behavior;
  determining, by the computer, an execution probability of the sample behavior based on the obtained first reference contribution value of each piece of the sample characteristic data and the obtained second reference contribution value of the every N pieces of the sample characteristic data; and
  adjusting, by the computer, a model parameter of the behavior prediction model based on a difference between the execution probability of the sample behavior and the behavior label, and continuing training until a training stop condition is met, to obtain the behavior prediction model whose model parameter is adjusted.

9. The method according to claim 8, wherein the determining, by the computer, an execution probability of the sample behavior based on the obtained first reference contribution value of each piece of the sample characteristic data and the obtained second reference contribution value of the every N pieces of the sample characteristic data comprises:
  performing, by the computer, summation on the obtained first reference contribution value of each piece of the sample characteristic data and the reference contribution value, to obtain a first reference comprehensive contribution value;
  inputting, by the computer, each obtained second reference contribution value of each piece of the sample characteristic data into a neural network;
  using, by the computer, an output of the neural network as a second reference comprehensive contribution value; and
  performing, by the computer, weighted summation on the first reference comprehensive contribution value and the second reference comprehensive contribution value based on a preset weight value, to obtain the execution probability of the sample behavior,
  wherein the model parameter comprises at least the reference contribution value, a weight and an offset that are between neurons in the neural network, and the preset weight value.

10. A user behavior prediction apparatus, wherein the apparatus comprises:
  at least one processor; and
  a non-transitory computer-readable storage medium coupled to the at least one processor and storing programming instructions for execution by the at least one processor, wherein the programming instructions instruct the at least one processor to perform the following operations:
    obtaining behavior prediction information that is used to predict a specified behavior, wherein the behavior prediction information comprises a plurality of pieces of characteristic data, and wherein any two pieces of the characteristic data belong to different categories;
    obtaining a first contribution value of each of the plurality of pieces of characteristic data for the specified behavior, wherein the first contribution value is used to indicate a degree of impact on execution of the specified behavior, and wherein the first contribution value is positively correlated with the degree of impact;
    processing every N pieces of the characteristic data in the plurality of pieces of characteristic data by using one corresponding characteristic interaction model, to obtain a second contribution value of the every N pieces of the characteristic data for the specified behavior, wherein N is an integer greater than 1, wherein one characteristic interaction model corresponding to any N pieces of the characteristic data is determined based on N categories to which the any N pieces of the characteristic data belong, wherein the second contribution value is used to indicate a degree of impact on execution of the specified behavior, and wherein the second contribution value is positively correlated with the degree of impact; and
    determining an execution probability of the specified behavior based on the obtained first contribution value of each piece of the characteristic data and the obtained second contribution value of the every N pieces of the characteristic data.

11. The apparatus according to claim 10, wherein the programming instructions further instruct the at least one processor to perform the following operation steps:
  determining a first comprehensive contribution value based on the obtained first contribution value of each piece of the characteristic data;
  determining a second comprehensive contribution value based on the obtained second contribution value of the every N pieces of the characteristic data; and
  performing weighted summation on the first comprehensive contribution value and the second comprehensive contribution value by using a preset weight value, to obtain the execution probability.

12. The apparatus according to claim 11, wherein the programming instructions further instruct the at least one processor to perform the following operation steps:
  performing summation on the obtained second contribution value of the every N pieces of the characteristic data, to obtain the second comprehensive contribution value; or
  inputting each obtained second contribution value of the every N pieces of the characteristic data into a neural network, and use an output of the neural network as the second comprehensive contribution value.

13. The apparatus according to claim 11, wherein the programming instructions further instruct the at least one processor to perform the following operation steps:
    performing summation on the obtained first contribution value of each piece of the characteristic data and a reference contribution value, to obtain the first comprehensive contribution value.

14. The apparatus according to claim 10, wherein the programming instructions further instruct the at least one processor to perform the following operation steps:
    before obtaining the first contribution value of each of the plurality of pieces of characteristic data for the specified behavior, determining a characteristic identifier of each of the plurality of pieces of characteristic data based on a correspondence between characteristic data and a characteristic identifier; and
    determining, based on a correspondence between a characteristic identifier and a contribution value, a first contribution value corresponding to the characteristic identifier of each of the plurality of pieces of characteristic data.

15. The apparatus according to claim 10, wherein the programming instructions further instruct the at least one processor to perform the following operation steps:
    before obtaining the first contribution value of each of the plurality of pieces of characteristic data for the specified behavior, determining a characteristic identifier of each of the plurality of pieces of characteristic data based on a correspondence between the characteristic data and a characteristic identifier;
    obtaining a characteristic vector corresponding to a characteristic identifier of each of the every N pieces of the characteristic data, wherein characteristic vectors corresponding to all the characteristic identifiers have an equal length; and
    processing the obtained N characteristic vectors by using one characteristic interaction model corresponding to N categories to which the every N pieces of the characteristic data belong, to obtain the second contribution value of the every N pieces of the characteristic data for the specified behavior.

16. The apparatus according to claim 10, wherein the programming instructions further instruct the at least one processor to perform the following operation steps:
    before the processing the every N pieces of the characteristic data in the plurality of pieces of characteristic data by using one corresponding characteristic interaction model, determining one corresponding characteristic interaction model for the every N pieces of the characteristic data in the plurality of pieces of characteristic data based on a correspondence between a characteristic interaction model and a category, wherein the correspondence comprises a plurality of characteristic interaction models, wherein each characteristic interaction model corresponds to N categories, and wherein any two characteristic interaction models correspond to different categories.

17. A behavior prediction model training apparatus, wherein a behavior prediction model comprises a plurality of characteristic interaction models, wherein each characteristic interaction model corresponds to N categories, wherein any two characteristic interaction models correspond to different categories, wherein the category is a category of sample characteristic data in training sample data, and wherein the apparatus comprises:
    at least one processor; and
    a non-transitory computer-readable storage medium coupled to the at least one processor and storing programming instructions for execution by the at least one processor, wherein the programming instructions instruct the at least one processor to perform the following operations:
    obtaining the training sample data, wherein the training sample data comprises a plurality of pieces of sample characteristic data and a behavior label of a sample behavior, wherein any two pieces of sample characteristic data belong to different categories, and wherein the behavior label is used to indicate whether a user executes the sample behavior;
    obtaining a first reference contribution value of each of the plurality of pieces of sample characteristic data for the sample behavior, wherein the first reference contribution value is used to indicate a degree of impact on execution of the sample behavior, and wherein the first contribution value is positively correlated with the degree of impact;
    processing every N pieces of the sample characteristic data in the plurality of pieces of sample characteristic data by using one corresponding characteristic interaction model, to obtain a second reference contribution value of the every N pieces of the sample characteristic data for the sample behavior, wherein the second reference contribution value is used to indicate a degree of impact on execution of the sample behavior, and wherein the second reference contribution value is positively correlated with the degree of impact;
    determining an execution probability of the sample behavior based on the obtained first reference contribution value of each piece of the sample characteristic data and the obtained second reference contribution value of the every N pieces of the sample characteristic data; and
    adjusting a model parameter of the behavior prediction model based on a difference between the execution probability of the sample behavior and the behavior label, and continue training until a training stop condition is met, to obtain the behavior prediction model whose model parameter is adjusted.

18. The apparatus according to claim 17, wherein the programming instructions further instruct the at least one processor to perform the following operation steps:
    performing summation on the obtained first reference contribution value of each piece of the sample characteristic data and a reference contribution value, to obtain a first reference comprehensive contribution value;
    inputting each obtained second reference contribution value of each piece of the sample characteristic data into a neural network;
    using an output of the neural network as a second reference comprehensive contribution value; and
    performing weighted summation on the first reference comprehensive contribution value and the second reference comprehensive contribution value based on a preset weight value, to obtain the execution probability of the sample behavior,
    wherein the model parameter comprises at least the reference contribution value, a weight and an offset that are between neurons in the neural network, and the preset weight value.

19. A non-transitory computer readable storage medium, wherein the computer readable storage medium stores an instruction, and wherein when the computer readable storage medium runs on a computer, the computer is enabled to perform:

obtaining behavior prediction information that is used to predict a specified behavior, wherein the behavior prediction information comprises a plurality of pieces of characteristic data, and wherein any two pieces of characteristic data belong to different categories;

obtaining a first contribution value of each of the plurality of pieces of characteristic data for the specified behavior, wherein the first contribution value is used to indicate a degree of impact on execution of the specified behavior, and wherein the first contribution value is positively correlated with the degree of impact;

processing every N pieces of the characteristic data in the plurality of pieces of characteristic data by using one corresponding characteristic interaction model, to obtain a second contribution value of the every N pieces of the characteristic data for the specified behavior, wherein N is an integer greater than 1, wherein one characteristic interaction model corresponding to any N pieces of the characteristic data is determined based on N categories to which the any N pieces of the characteristic data belong, wherein the second contribution value is used to indicate a degree of impact on execution of the specified behavior, and wherein the second contribution value is positively correlated with the degree of impact; and determining an execution probability of the specified behavior based on the obtained first contribution value of each piece of the characteristic data and the obtained second contribution value of the every N pieces of the characteristic data.

* * * * *